US012472177B2

(12) United States Patent
Cogram et al.

(10) Patent No.: US 12,472,177 B2
(45) Date of Patent: Nov. 18, 2025

(54) BICYCLIC COMPOUNDS AND METHODS FOR THEIR USE IN TREATING PITT HOPKINS SYNDROME

(71) Applicant: NEUREN PHARMACEUTICALS LIMITED, Auckland (NZ)

(72) Inventors: Patricia Cogram, Oxford (GB); Jonathan Pilcher, Sandringham (AU); Lawrence Irwin Glass, Takoma Park, MD (US)

(73) Assignee: NEUREN PHARMACEUTICALS LIMITED, Auckland (NZ)

( * ) Notice: Subject to any disclaimer, the term of this patent is extended or adjusted under 35 U.S.C. 154(b) by 712 days.

Patent file contains an affidavit/declaration under 37 CFR 1.130(b).

(21) Appl. No.: 17/770,690

(22) PCT Filed: Apr. 24, 2020

(86) PCT No.: PCT/US2020/029739
§ 371 (c)(1),
(2) Date: Apr. 21, 2022

(87) PCT Pub. No.: WO2021/080646
PCT Pub. Date: Apr. 29, 2021

(65) Prior Publication Data
US 2022/0387426 A1 Dec. 8, 2022
US 2023/0301994 A9 Sep. 28, 2023

Related U.S. Application Data

(60) Provisional application No. 62/924,452, filed on Oct. 22, 2019.

(51) Int. Cl.
| | | |
|---|---|---|
| *A61K 31/4985* | (2006.01) | |
| *A61K 31/436* | (2006.01) | |
| *A61K 38/18* | (2006.01) | |
| *A61K 38/21* | (2006.01) | |
| *A61K 38/27* | (2006.01) | |
| *A61K 38/30* | (2006.01) | |
| *A61K 39/395* | (2006.01) | |
| *A61P 25/28* | (2006.01) | |

(52) U.S. Cl.
CPC ........ *A61K 31/4985* (2013.01); *A61K 31/436* (2013.01); *A61K 38/1825* (2013.01); *A61K 38/1841* (2013.01); *A61K 38/185* (2013.01); *A61K 38/212* (2013.01); *A61K 38/215* (2013.01); *A61K 38/217* (2013.01); *A61K 38/27* (2013.01); *A61K 38/30* (2013.01); *A61K 39/3955* (2013.01); *A61P 25/28* (2018.01)

(58) Field of Classification Search
CPC .............. A61K 31/4985; A61K 31/436
See application file for complete search history.

(56) References Cited

U.S. PATENT DOCUMENTS

| | | |
|---|---|---|
| 8,519,127 B2 | 8/2013 | Bickerdike et al. |
| 9,867,823 B2 * | 1/2018 | Glass ............... A61P 25/00 |
| 2018/0140601 A1 | 5/2018 | Glass et al. |

FOREIGN PATENT DOCUMENTS

| | | |
|---|---|---|
| WO | WO 2005/023815 | 3/2005 |
| WO | WO 2008/063311 | 5/2008 |

OTHER PUBLICATIONS

Neuren Pharmaceuticals—ASX Announcement on May 17, 2019, https://www.neurenpharma.com/pdf/6b61b585-6691-4752-8f4b-4f0e5c9ea8e3/NNZ2591-positive-effects-in-Pitt-Hopkins-syndrome-model.pdf, retrieved Feb. 25, 2025. (Year: 2019).*
PubChem compound summary of Nnz-2591, retrieved from https://pubchem.ncbi.nlm.nih.gov/compound/nnz-2591 on Feb. 25, 2025 (Year: 2025).*
Extended Search Report for European Patent Application No. 20879517.9, dated Oct. 30, 2023, 9 pages.
Official Action with Machine Translation for Eurasia Patent Application No. 202291235/28, dated Sep. 18, 2023, 8 pages.
International Search Report and Written Opinion for International (PCT) Patent Application No. PCT/US20/29739, dated Sep. 4, 2020, 11 pages.
Jones "NNZ-2591 demonstrates positive effects in Pitt Hopkins syndrome pre-clinical model," Neuren Pharmaceuticals, May 17, 2019, 2 pages.
PubChem-CID-125507644, Create Date, Apr. 10, 2017, 9 pages.
PubChem-CID-11735696, Create Date Oct. 26, 2006, 19 pages.
PubChem-CID-139588715, Create Date, Nov. 4, 2019, 9 pages.
"Neuren's Investigational NNZ2591 Rescues Motor and Cognitive Functions, Moue Study Shows," Angelman Syndrome Foundation, Aug. 19, 2019, 3 pages [retrieved online from: www.angelman.org/neurens-investigational-nmz-2591-rescues-motorand-cognitive-functions-mouse-study-shows].
"Neuren's third lead drug candidate, NNZ-2591, proves effective at reversing memory loss," Neuren Pharmaceuticals, 2006, Press Release, 4 pages [retrieved online from: www.neurenpharma.com/pdf/3f00d76c-de64-4546-baa8-26c74df1813e/NNZ-291-positive-memory-loss-reversal-results.pdf].
"Pitt Hopkins Research Foundation post," Facebook, Oct. 17, 2019, 2 pages [retrieved online from: www.facebook.com/pitthopkins.org/posts/pfbid02caawRJjbzEryFGCJmD6tJPEvVQd3VAGDPLb4acpX5LRFbr77PRJcVuHVAQqPLJWG1].

(Continued)

Primary Examiner — Adam C Milligan
Assistant Examiner — Karen Cheng
(74) Attorney, Agent, or Firm — Sheridan Ross P.C.

(57) ABSTRACT

Embodiments of this invention provide compounds, compositions, methods, and uses for therapeutic diketopiperazines, including cyclic G-2-Allyl Proline and other cyclic Glycyl Proline compounds to treat Pitt Hopkins Syndrome and symptoms thereof, as well as manufacture of compositions, medicaments including tablets, capsules, liquid formulations, gels, injectable solutions, and other formulations that are useful for treatment of such conditions.

18 Claims, 7 Drawing Sheets

(56) References Cited

OTHER PUBLICATIONS

Cotton "Neuren Pharma granted orphan drug status for treatment of Phelan-McDermid, Pitt Hopkins and Angelman syndromes," Small Caps, Oct. 17, 2019, 4 pages [retrieved online from: smallcaps.com/au/neuren-pharma-orphan-drug-status-treatment-phelan-mcdermid-pitt-hopkins-angelman-syndromes/?fbclid=lwY2xjawH9%E2%80%A6].

Official Action with English Translation for Japan Patent Application No. 2022-523653, dated Feb. 4, 2025, 10 pages.

* cited by examiner

Structure of Cyclic Glycyl-2-Allyl Proline

BICYCLIC COMPOUNDS AND METHODS FOR THEIR USE IN TREATING PITT HOPKINS SYNDROME

CROSS REFERENCE TO RELATED APPLICATIONS

This application is a national stage application under 35 U.S.C. 371 and claims the benefit of PCT Application No. PCT/US2020/029739 having an international filing date of 24 Apr. 2020, which designated the United States, and which PCT application claimed the benefit of U.S. Provisional Application No. 62/924,452 filed 22 Oct. 2019, the contents of each of which are incorporated herein by reference in their entireties.

FIELD OF THE INVENTION

This PCT International Patent Application claims priority to U.S. Provisional Patent Application No. 62/924,452 filed 22 Oct. 2019 and relates to bicyclic compounds structurally related to diketopiperazines and methods for their therapeutic use in treating Pitt Hopkins Syndrome. For example, this disclosure relates to the use of cyclic Glycyl Proline ("cGP") and analogs thereof, including cyclic Glycyl-2-Allyl Proline ("cyclic G-2-AllylP" or "cG-2-AllylP"), cyclic cyclohexyl-G-2-MeP, cyclic cyclopentyl-G-2-MeP, and/or related compounds and pharmaceutical compositions thereof in the treatment of Pitt Hopkins Syndrome (PTHS). The Provisional Patent Application is incorporated herein fully by reference.

Background

Pitt Hopkins syndrome (PTHS) is a rare genetic condition caused by heterozygous hypomorphic or null mutation or deletion of the transcription factor 4 (TCF4) gene on human chromosome 18q21.1 (Sweatt, 2013). TCF4 haploinsufficiency has been proposed as an underlying mechanism for PTHS. TCF4 encodes a basic helix-loop-helix (bHLH) transcription factor that is known to heterodimerize with several other bHLH transcription factors that play important roles in neurogenesis and neuronal migration in the brain. There currently is no cure or treatment specifically for PTHS.
Clinical Presentation Pitt Hopkins syndrome (PTHS) is characterized by significant developmental delays with moderate-to-severe intellectual disability and behavioral differences, characteristic facial features, and episodic hyperventilation and/or breath-holding while awake. Speech is significantly delayed and most individuals are nonverbal with receptive language often stronger than expressive language. Other common findings are autism spectrum disorder symptoms, sleep disturbance, stereotypic hand movements, seizures, constipation, and severe myopia (Sweetser et al, 2012).

Formal prevalence studies have not been conducted so the true prevalence of PTHS has not been established. Rosenfeld et al, (2009) estimated the frequency of chromosome 18q21 deletions associated with PTHS is between 1:34,000 and 1:41,000. Sweetser et al, (2012) note that if deletions are found in approximately one third of individuals with PTHS, the frequency of the condition could be as high as 1:11,000. According to the range of prevalence estimates above, if the US population is currently at least 327,167,434 (US Census 2018), then between 8000 and 30,000 US citizens may be affected by PTHS.

Pitt Hopkins syndrome affects both males and females and can affect individuals of any ethnic or racial background. Approximately 1000 affected individuals have been enrolled in a patient registry by the Pitt Hopkins Foundation.

Pitt Hopkins Syndrome is a severely limiting disorder in which affected individuals rarely achieve the functional capacity to care for themselves, protect themselves from harm, form normal adult relationships, or achieve gainful employment. Such a severe disability results in significant costs for medical and supportive care. The condition is also associated with challenging behaviors that create acute and chronic stress for caregivers. There are no approved products indicated for the treatment of PTHS.

SUMMARY

We have found a new problem in the field, namely how to effectively treat Pitt Hopkins Syndrome. To do this, we studied the effects of certain analogs of diketopiperazines in an animal model of Pitt Hopkins Syndrome (PTHS). Mice having mutations of the tcf4 (TCF4) gene and mice without the mutation were studied in a controlled trial. Because tcf4 mutant mice exhibit features of PTHS, studies of the effects of the diketopiperazines, cG-2-AllylP, cyclic cyclohexyl-G-2-MeP, cyclic cyclopentyl-G-2-MeP and related cyclic piperidines are predictive of effects in human beings with PTHS.

Therefore, we treat patients with PTHS with cG-2-AllylP, cyclic cyclohexyl-G-2-MeP, cyclic cyclopentyl-G-2-MeP or related cyclic piperidines to circumvent the TCF4 deficiency, mimicking the natural actions of cGP by rescuing the abnormal dendritic morphology and stimulating protein synthesis in excitatory synapses through, but not necessarily exclusively through, the following mechanisms:

1. Reducing neuroinflammation and pathological glial activation;
2. Normalizing AKT expression and activation upstream of mTOR in the PI3K-AKT-mTOR pathway;
3. Normalizing ERK expression and activation in the MAPK-ERK signaling pathway; and/or
4. Restoring normal levels and/or bioavailability of IGF-1.

As described below, oral administration of cG-2-AllylP for 6 weeks can rescue the phenotype of the Tcf4$^{+/-}$ knock-out mouse model of PTHS, while having no impact on wild type control mice.

Cyclic GP is cG-2-AllylP and related compounds are shown as formula 1

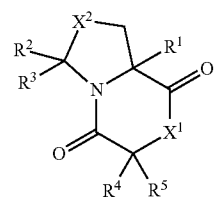

Formula 1

In some aspects, compounds of Formula 1 include substituents where:

$X^1$ is selected from the group consisting of NR', O and S;
$X^2$ is selected from the group consisting of $CH_2$, NR', O and S;
$R^1$, $R^2$, $R^3$, $R^4$ and $R^5$ are independently selected from the group consisting of —H, —OR', —SR', —NR'R', —NO₂, —CN, —C(O)R', —C(O)OR', —C(O)NR'R', —C(NR')NR'R', trihalomethyl, halogen, alkyl, substituted alkyl, heteroalkyl, substituted heteroalkyl, alkenyl, substituted alkenyl, alkynyl, substituted alkynyl, aryl, substituted aryl, heteroaryl, substituted heteroaryl, arylalkyl, substituted arylalkyl, heteroarylalkyl and substituted heteroarylalkyl; each R' is independently selected from the group consisting of —H, alkyl, heteroalkyl, alkenyl, alkynyl, aryl, arylalkyl, heteroaryl and heteroarylalkyl; or $R^4$ and $R^5$ taken together are —CH$_2$—(CH$_2$)$_n$—CH$_2$— where n is an integer from 0-6; or $R^2$ and $R^3$ taken together are —CH$_2$—(CH$_2$)$_n$—CH$_2$— where n is an integer from 0-6; with the proviso that when $R^1$=methyl and $R^2$=$R^3$=$R^4$=H then $R^5$≠benzyl and; when $R^1$=H, at least one of $R^2$ and $R^3$≠H.

In further aspects, this invention provides a compound of Formula 1 or a pharmaceutically acceptable salt, stereoisomer or hydrate thereof, wherein $R^1$=allyl, $R^2$=$R^3$=$R^4$=$R^5$=H, $X^1$=NH, $X^2$=CH$_2$ (cyclic Glycyl-2-AllylProline).

In still other aspects, this invention provides pharmaceutical compositions comprising a pharmaceutically acceptable excipient and a therapeutically effective amount of cyclic G-2-AllylP.

In further aspects, this invention provides methods of treating an animal having a cognitive impairment, comprising administration to that animal an effective amount of a composition comprising cyclic G-2-AllylP. In yet further aspects, the animal to be treated is a human.

BRIEF DESCRIPTION OF THE DRAWINGS

This disclosure is described with reference to specific embodiments thereof. Other aspects of this invention can be appreciated with reference to the drawings, in which.

DETAILED DESCRIPTION

Definitions

Figure 1:
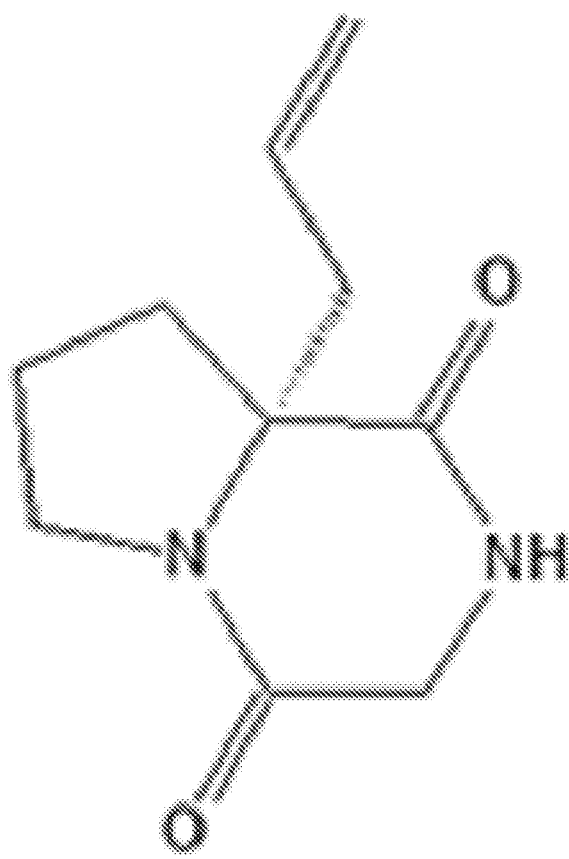
FIG. 1 depicts the chemical structure of cG-2-AllylP.

"Alkenyl" refers to an unsaturated branched, straight chain or cyclic hydrocarbon radical having at least one carbon-carbon double bond. The radical may be in either the cis or trans conformation about the double bond(s). Exemplary alkenyl groups include allyl, ethenyl, propenyl, isopropenyl, butenyl, isobutenyl, cyclopentenyl and the like. In some embodiments the alkenyl groups are (C$_2$-C$_6$) alkenyl, and in other embodiments, allyl can be particularly useful.

"Alkyl" refers to a saturated branched, straight chain or cyclic hydrocarbon radical. Exemplary alkyl groups include methyl, ethyl, isopropyl, cyclopropyl, tert-butyl, cyclopropylmethyl, hexyl and the like. In some embodiments the alkyl groups are (C$_1$-C$_6$) alkyl.

"Alkynyl" refers to an unsaturated branched, straight chain or cyclic hydrocarbon radical having at least one carbon-carbon triple bond. Exemplary alkynyl groups include ethynyl, propynyl, butynyl, isobutynyl and the like. In some embodiments the alkynyl group is (C$_2$-C$_6$) alkynyl.

"Aryl" refers to an unsaturated cyclic hydrocarbon radical with a conjugated π electron system. Exemplary aryl groups include phenyl, naphthyl and the like. In some embodiments the aryl group is (C$_5$-C$_{20}$) aryl.

"Arylalkyl" refers to a straight chain alkyl, alkenyl or alkynyl group wherein one of the hydrogen atoms bound to the terminal carbon is replaced with an aryl group. Exemplary arylalkyl groups include benzyl, naphthylmethyl, benzylidene and the like.

"Cognitive impairment"and" cognitive dysfunction" means one or more signs or symptoms of memory loss, loss of spatial orientation, decreased ability to learn, decreased ability to form short- or long-term memory, decreased episodic memory, decreased ability to consolidate memory, decreased spatial memory, decreased receptive language and/or communication, decreased expressive language and/or communication, decreased synaptogenesis, decreased synaptic stability, deficits in executive function, deficits in cognitive mapping and scene memory, deficits in declarative and relational memory, decreased rapid acquisition of configural or conjunctive associations, decreased context-specific encoding and retrieval of specific events, decreased episodic and/or episodic-like memory, anxiety, abnormal fear conditioning, abnormal social behaviour, repetitive behaviour, restrictive behavior, abnormal sleep behavior, aggressive behaviour, self-injurious behaviour, stereotypic hand movements, temper tantrums, seizure activity, abnormal locomotion, abnormal expression or activation of ERK1/2 or and Akt, and bradycardia.

"Comprising," and "Comprises" means including, but not limited to the elements listed.

"Consisting of" means including the elements listed and no others.

"Consisting essentially of" means including the elements listed and their equivalents.

"Growth factor" refers to an extracellularly active polypeptide that stimulates a cell to grow or proliferate by interacting with a receptor on the cell.

"Heteroalkyl" refers to an alkyl moiety wherein one or more carbon atoms are replaced with another atom such as N, P, O, S etc. Exemplary heteroalkyl groups include pyrrolidine, morpholine, piperidine, piperazine, imidazolidine, pyrazolidine, tetrahydrofuran, (C$_1$-C$_{10}$) substituted amines, (C$_2$-C$_6$) thioethers and the like.

"Heteroaryl" refers to an aryl moiety wherein one or more carbon atoms are replaced with another atom such as N, P, O, S etc. Exemplary heteroaryl groups include carbazole, furan, imidazole, indazole, indole, isoquinoline, purine, pyrazine, pyrazole, pyridazine, pyridine, pyrrole, thiazole, thiophene, triazole and the like.

"Pharmaceutically acceptable excipient" refers to an excipient that is useful in preparing a pharmaceutical composition that is generally safe, non-toxic, and desirable, and includes excipients that are acceptable for veterinary use as well as for human pharmaceutical use. Such excipients may be solid, liquid, semisolid, or, in the case of an aerosol composition, gaseous.

"Pharmaceutically acceptable salt" refers to a salt that is pharmaceutically acceptable and has the desired pharmacological properties. Such salts include salts that may be formed where acidic protons present in the compounds are capable of reacting with inorganic or organic bases. Suitable inorganic salts include those formed with the alkali metals, e.g. sodium and potassium, magnesium, calcium, and aluminium. Suitable organic salts include those formed with organic bases such as the amine bases e.g. ethanolamine, diethanolamine, triethanolamine, tromethamine, N-methylglucamine, and the like. Such salts also include acid addition salts formed with inorganic acids (e.g. hydrochloric and hydrobromic acids) and organic acids (e.g. acetic acid, citric acid, maleic acid, and the alkane- and arene-sulfonic acids such as methanesulfonic acid and benzenesulfonic acid).

When there are two acidic groups present, a pharmaceutically acceptable salt may be a mono-acid mono-salt or a di-acid salt; and similarly where there are more than two acidic groups present, some or all of such groups can be present as salts.

"Protecting group" has the meaning conventionally associated with it in organic synthesis, i.e. a group that selectively blocks one or more reactive sites in a multifunctional compound such that a chemical reaction can be carried out selectively on another unprotected reactive site and such that the group can readily be removed after the selective reaction is complete.

"Stereoisomer" is a molecule having the structure of cyclic G-2-Allyl Proline, but having a chiral center. The term "cyclic G-2-Allyl Proline" includes all stereoisomers.

"Substituted" refers to where one or more of the hydrogen atoms on an alkyl, heteroalkyl, alkenyl, alkynyl, aryl, heteroaryl or arylalkyl radical are independently replaced with another substituent. Substituents include —R', —OR', —SR', —NR'R', —NO$_2$, —CN, —C(O)R', —C(O)OR', —C(O)NR'R', —C(NR')NR'R', —NR'—C(NR')—OR', —NR'—C(NR')—SR', NR'—C(NR')—NR'R', trihalomethyl and halogen where each R' is independently —H, alkyl, heteroalkyl, alkenyl, alkynyl, aryl, arylalkyl, heteroaryl or heteroarylalkyl.

"Symptom" or "symptoms" means one or more of cognitive impairment or cognitive dysfunction, one or more signs or symptoms of memory loss, loss of spatial orientation, decreased ability to learn, decreased ability to form short- or long-term memory, decreased episodic memory, decreased ability to consolidate memory, decreased spatial memory, decreased receptive language and/or communication, decreased expressive language and/or communication, decreased synaptogenesis, decreased synaptic stability, deficits in executive function, deficits in cognitive mapping and scene memory, deficits in declarative and relational memory, decreased rapid acquisition of configural or conjunctive associations, decreased context-specific encoding and retrieval of specific events, decreased episodic and/or episodic-like memory, anxiety, abnormal fear conditioning, abnormal social behaviour, repetitive behaviour, restrictive behavior, abnormal sleep behavior, aggressive behaviour, self-injurious behaviour, stereotypic hand movements, temper tantrums, seizure activity, abnormal locomotion, abnormal expression or activation of ERK1/2 or and Akt, and bradycardia.

"Therapeutically effective amount" means the amount that, when administered to an animal for treating a disease, is sufficient to effect treatment for a disease. A "therapeutically effective amount" means an amount that decreases adverse symptoms or findings, promotes desirable symptoms or findings, and/or treats an underlying disorder, and/or is curative.

"Treating" or "treatment" of a disease includes prophylaxsis, meaning inhibiting a symptom of the disease in an animal that may be predisposed to the disease but does not yet experience or exhibit symptoms of the disease, inhibiting the disease (slowing or arresting its development), providing relief from the symptoms or side-effects of the disease (including palliative treatment), and relieving the disease (causing regression of the disease). Treatment does not include correcting genetic abnormalities of Pitt Hopkins Syndrome.

Implicit hydrogen atoms (such as the hydrogens on the pyrrole ring, etc.) are omitted from the formulae for clarity, but should be understood to be present.

"ATF3" means Activating Transcription Factor 3.
"IL1-beta" means Interleukin 1-beta.
"IL-6" means Interleukin-6.
"BDNF" means Brain Derived Neurotropic factor.
"Cdh2" means Cadherin-2.
"Cebpb" means CCAAT/enhancer-binding protein beta.
"Crem" means cyclic-AMP response element binding.
"Egr1" means Early Growth Response Protein 1.
"Gria 4" means Glutamate Receptor Ionotropic AMPA 4.
"Grm5" means Metabotropic Glutamate Receptor 5.
"Mapk 1" means Mitogen-Activated Protein Kinase 1.
"Nr4a1" means Nuclear Receptor Subfamily 4 Group A member 1, also known as Nerve Growth Factor IB.
"Ntf3" means Neurotrophin 3.
"Ntf4" means Neurotrophin 4.
"Pcdh8" means Protocadherin-8.
"Plm1" means Pre-mRNA Leakage Protein 1.
"Ppp3ca" means Protein Phosphatase 3, Catalytic Subunit, Alpha.
"Tnf" means Tumor Necrosis Factor.
PTHS means Pitt Hopkins Syndrome.
"cG-2-AllylP," "cyclic Glycyl-2-AllylP," "NNZ2591," and "NNZ-2591" each mean (8aS)-Allyl-hexahydropyrrolo[1,2-a]pyrazine-1,4-dione.
"Cyclic cyclohexyl-G-2-MeP" means (8aS)-Methyl-spiro[cyclohexane-1,3(4H)-tetrahydropyrrolo[1,2-a]pyrazine]-1,4(2H)-dione.
"Cyclic cyclopentyl-G-2-MeP" means (8aS)-Methyl-spiro[cyclopentane-1,3(4H)-tetrahydropyrrolo[1,2-a]pyrazine]-1,4(2H)-dione.
"tcf4" and "TCF4" refer to a gene implicated in PTHS.
"tcf4$^{+/-}$" means the heterozygous mutation of the TCF4 gene associate with PTHS.
Tcf4$^{+/+}$ means wild-type TCF4.

Genetic Abnormalities in Pitt Hopkins Syndrome

Impairment of the structure and function of synapses is a fundamental feature of PTHS. TCF4 is a transcription factor which regulates neurogenesis and neuronal migration in the brain. In humans, loss of function of the TCF4 gene leads to the rare neurodevelopmental disorder, PTHS, which is characterized by intellectual disability, developmental delay, and autistic behaviour. TCF4 is highly expressed during embryonic and early postnatal development (de Pontual et al, 2009) and has particularly high expression in the hippocampus (Brzózka et al, 2010; Sepp et al, 2011; Navarrete et al, 2013). It is also expressed in adult brain, lymphocytes, fibroblasts, gut, muscle, and myenteric plexus (Pscherer et al, 1996; Amiel et al, 2007; Brockschmidt et al, 2007; de Pontual et al, 2009). Recent cognitive and imaging studies have also shown that TCF4 is important for normal brain function (Blake et al, 2010; Navarrete et al, 2013).

Deletions and mutations of the TCF4 gene disrupt the corresponding protein's ability to control the downstream activity of genes related to nervous system development and function (Sweatt, 2013). In particular, investigations have shown that TCF4 interacts with a potentially large repertoire of transcription factors including the products of proneural genes such as ASCL1, ATOH1, and NEUROD1 to regulate neurogenesis, cell differentiation, cell signaling, and survival in the developing brain (Flora et al, 2007; Blake et al, 2010; Brzózka et al, 2010; Bertrand et al, 2002; Forrest et al, 2013).

Crux et al's, (2018) work on the consequences of functional loss of TCF4 on dendritic spines in mature neurons showed, with both homo- and heterozygous loss of TCF4, a reduction in the number of dendritic spines and changes in their morphology. This work suggested that TCF4 plays an important role in synaptic plasticity in mature neurons, independent of its developmental function, and functional loss of TCF4 may contribute to the neurological symptoms in PTHS.

Changes in TCF4 also appear to alter gene expression of components of the IGF signaling pathways, in particular the down-regulation of genes encoding IGF binding proteins 3, 4, and 5 (Forrest et al, 2013). Cyclic Glycine-Proline has been reported to regulate binding of IGF-1 to IGF binding protein 3 in the brain and, as a consequence, regulate the bioavailability of IGF-1 (Guan et al, 2014). This auto-regulatory mechanism maintains homeostasis of IGF-1, increasing bioavailability when IGF-1 is deficient and decreasing bioavailability when IGF-1 levels are excessive. Both cGP and cG-2-AllylP also inhibit neuroinflammation which is part of the pathology underlying PTHS and contributes to over-activation of microglia which is critical for synaptic development and maintenance. Across numerous animal models of neurodevelopmental disorders, cG-2-AllylP normalizes the microglial phenotype which helps to restore synaptic function and morphology.

Clinical Tools for Evaluating Pitt Hopkins Syndrome

Pitt Hopkins Syndrome can be assessed using one or more clinical tests, for example, Aberrant Behavior Checklist Community Edition (ABC), Aberrant Behavior Checklist (Stereotypy), Vinelands, Clinical Global Impression of Severity (CGI-S), the Caregiver Strain Questionnaire (CSQ), Children's Yale-Brown OC Scale (CYBOCS-PDD), Child Autism Rating Scale, Interview of Repetitive Behaviors, Nisonger Child Behavior Rating Scale, Pervasive Developmental Disorder Behavior Inventory, Stereotyped Behavior Scale, Repetitive Behavior Scale, Rossago Scale, Repetitive Behavior Questionnaire, PedQL™ Measurement Model, and Stereotyped Behavior Scale, or one or more physiological test selected from the group consisting of electroencephalogram (EEG) spike frequency, overall power in frequency bands of an EEG, hand movement, QTc and heart rate variability (HRV), and respiratory irregularities compared to control animals not suffering from said disorder.

Anxiety can be assessed using one or more measures including, Anxiety, Depression and Mood Scale (ADAMS), Child and Adolescent Symptom Inventory (CASI), Child Behavior Checklist (CBCL), Multidimensional Anxiety Scale for Children (MASC), Pediatric Autism Rating Scale (PARS), Revised Child Anxiety and Depression Scale (RCAD), Screen for Child Anxiety Related Disorders (SCARED). Nisonger Child Behavior Rating Form, and Anxiety Diagnostic Interview Scale (ADIS).

Social communication can be assessed using clinical tools, for example, ABAS-II Domain scores, Aberrant Behavior Checklist (ABC)-Lethargy/Social Withdrawal, ADI-R, Autism Diagnostic Observation Scale-Generic (ADOS-G)-new severity scores, Autism Impact Measure, Autism Spectrum Rating Scales, Autism Treatment Evaluation Checklist (ATEC), Ball Toss Game, Behavior Assessment Scale (BAS), Behavior Assessment System for Children 2nd Edition BASC-2 (subscales relevant to social), Behavior Rating Inventory of Executive Function, California Verbal Learning Task-Children's Version (VLT-C) and Modified VLT-C(MVLT-C), Caregiver-Child Interaction, Jahromi 2009, CGI, Childhood Autism Rating Scale (CARS), Children's Social Behavior Questionnaire, Clinical Evaluation of Language Fundamentals (CELF-3 and 4)-Pragmatics Profile, Communication and Symbolic Behavior Scales (CSBS), Comprehension of Affective Speech Task, General Trust Scale, Gilliam Autism Rating Scale (GARS), Joint Attention Measure from the ESCS (JAMES), Let's Face It!, Observational Assessment of Spontaneous Expressive Language (OSEL), Parent Questionnaire, Nagaraj et al. 2006, Parent's Rating Questionnaire, Chan et al, 2009, Pervasive Developmental Disorder Behavior Inventory (PDD-BI) (Short version available: PDD-BI-Screening Version), Reading the Mind in Films-Adult, Reading the Mind in Films-Child, Reading the Mind in the Eyes Task-Revised (RMET-R)-Adult, Reading the Mind in the Eyes Task-Revised (RMET-R)-Child, Reading the Mind in Voice-Adult, Social Communication Questionnaire (SCQ), Social Responsiveness Scale, Social Skills Improvement System (SSiS), Theory of Mind Test, and VABS-Socialization and Communication.

Compounds of the Invention

Certain embodiments of this disclosure include derivatives of cyclic Glycyl Proline ("cGP") having structures as described below.

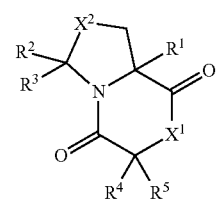

Formula 1

In certain embodiments, compounds of Formula 1 include substituents where:

$X^1$ is selected from the group consisting of NR', O and S;
$X^2$ is selected from the group consisting of $CH_2$, NR', O and S;
$R^1$, $R^2$, $R^3$, $R^4$ and $R^5$ are independently selected from the group consisting of —H, —OR', —SR', —NR'R', —$NO_2$, —CN, —C(O)R', —C(O)OR', —C(O)NR'R', —C(NR')NR'R', trihalomethyl, halogen, alkyl, substituted alkyl, heteroalkyl, substituted heteroalkyl, alkenyl, substituted alkenyl, alkynyl, substituted alkynyl, aryl, substituted aryl, heteroaryl, substituted heteroaryl, arylalkyl, substituted arylalkyl, heteroarylalkyl and substituted heteroarylalkyl; each R' is independently selected from the group consisting of —H, alkyl, heteroalkyl, alkenyl, alkynyl, aryl, arylalkyl, heteroaryl and heteroarylalkyl;

or $R^4$ and $R^5$ taken together are —$CH_2$—$(CH_2)_n$—$CH_2$— where n is an integer from 0-6;

or $R^2$ and $R^3$ taken together are —$CH_2$—$(CH_2)_n$—$CH_2$— where n is an integer from 0-6; with the proviso that when $R^1$=methyl and $R^2$=$R^3$=$R^4$=H then $R^5$≠benzyl and; when $R^1$=H, at least one of $R^2$ and $R^3$≠H.

In further embodiments, compounds of Formula 1 include substituents where:

$R^1$=methyl, $R^2$=$R^3$=$R^4$=$R^5$=H, $X^1$=NH, $X^2$=$CH_2$;
$R^1$=allyl, $R^2$=$R^3$=$R^4$=$R^5$=H, $X^1$=NH, $X^2$=$CH_2$;
$R^1$=$R^2$=$R^3$=H, $R^4$=$R^5$=methyl, $X^1$=NH, $X^2$=$CH_2$;
$R^1$=$R^4$=$R^5$=H, $R^2$=$R^3$=methyl, $X^1$=NH, $X^2$=$CH_2$.

In other embodiments of the invention, compounds of Formula 1 include substituents where;

$R^4$ and $R^5$ taken together are —$CH_2$—$(CH_2)_n$—$CH_2$— and;

$R^1$=methyl, $R^2$=$R^3$=H, n=0, $X^1$=NH, $X^2$=$CH_2$;
$R^1$=methyl, $R^2$=$R^3$=H, n=2, $X^1$=NH, $X^2$=$CH_2$;
$R^1$=allyl, $R^2$=$R^3$=H, n=0, $X^1$=NH, $X^2$=$CH_2$.
$R^1$=allyl, $R^2$=$R^3$=H, n=2, $X^1$=NH, $X^2$=$CH_2$.
$R^1$=methyl, $R^2$=$R^3$=H, n=3, $X^1$=NH, $X^2$=$CH_2$;
$R^1$=allyl, $R^2$=$R^3$=H, n=3, $X^1$=NH, $X^2$=$CH_2$.

In still other embodiments of the disclosure, compounds of Formula 1 include substituents where $R^1$=methyl or allyl, $R^2$=$R^3$=$R^4$=H and $R^5$ is selected from the group consisting of the side chains of the amino acids: alanine, arginine, asparagine, aspartic acid, cysteine, glutamic acid, glutamine, histidine, isoleucine, leucine, lysine, methionine, proline, serine, threonine, tryptophan, tyrosine, valine, norvaline, norleucine, citruline, ornithine, homocysteine, homoserine, alloisoleucine, isovaline, sarcosine and the like.

In yet further embodiments of the invention, compounds of Formula 1 include substituents where:

$R^1$=methyl, $R^2$=$R^3$=methyl, $R^4$=$R^5$=H, $X^1$=NH and $X^2$=S;
$R^1$=allyl, $R^2$=$R^3$=methyl, $R^4$=$R^5$=H, $X^1$=NH, and $X^2$=S.

Those with skill in the art will appreciate that the above structural representations can contain chiral centres, the number of which will depend on the different substituents. The chirality may be either R or S at each center. The structural drawings can represent only one of the possible tautomeric, conformational diastereomeric or enantiomeric forms, and it should be understood that the invention encompasses any tautomeric, conformational isomeric diastereomeric or enantiomeric form, which exhibits biological or pharmacological activity as described herein.

Pharmacology and Utility

Cyclic Glycyl-2-Allyl Proline (cG-2-AllylP) is described in U.S. Utility application Ser. No. 11/399,974 filed Apr. 7, 2006, entitled "Cyclic G-2Allyl Proline in Treatment of Parkinson's Disease," now U.S. Pat. No. 7,776,876, issued Aug. 17, 2010, U.S. Utility application Ser. No. 10/570,395, filed Mar. 2, 2006 entitled "Neuroprotective Bicyclic Compounds and Methods for Their Use," now U.S. Pat. No. 8,067,425, PCT International Patent Application No: PCT/US2004/028308, entitled "Neuroprotective Bicyclic Compounds and Methods for Their Use," U.S. Provisional Patent Application Ser. No. 60/499,956 filed Sep. 3, 2003, entitled "Neuroprotective Bicyclic Compounds and Methods for Their Use," and U.S. patent application Ser. No. 13/043,215 filed Mar. 8, 2011, entitled "Cyclic Glycyl-2-AllylProline Improves Cognitive Performance in Impaired Animals." Each of the above patent applications and patents is expressly incorporated herein fully by reference.

Other agents can be administered along with a compound of this invention. Such other agents may be selected from the group consisting of for example, growth factors and associated derivatives, e.g., insulin-like growth factor-I (IGF-I), insulin-like growth factor-II (IGF-II), the tripeptide GPE, transforming growth factor-β1, activin, growth hormone, nerve growth factor, growth hormone binding protein, and/or IGF-binding proteins.

Therapeutic Applications

Compositions and methods of the invention find use in the treatment of animals, such as human patients, suffering from cognitive impairment and symptoms associated with Pitt Hopkins Syndrome. Still more generally, the compositions and methods of the disclosure find use in the treatment of mammals, such as human patients, suffering from memory impairment, intellectual disability, impaired social interaction, impairments in language and communication, impaired motor function, restricted and repetitive interests and behaviours, abnormal sleep behaviors, other aberrant behaviors and seizures.

Pharmaceutical Compositions and Administration cG-2-AllylP, cyclic cyclohexyl-G-2-MeP, cyclic cyclopentyl-G-2-MeP, and related cyclic piperidines can be administered as part of a medicament or pharmaceutical preparation. This can involve combining a compound of the invention with any pharmaceutically appropriate carrier, adjuvant or excipient. The selection of the carrier, adjuvant or excipient will of course usually be dependent upon the route of administration to be employed.

In general, compounds of this disclosure will be administered in therapeutically effective amounts by any of the usual modes known in the art, either singly or in combination with other conventional therapeutic agents for the disease being treated. A therapeutically effective amount may vary widely depending on the disease, its severity, the age and relative health of the animal being treated, the potency of the compound(s), and other factors. Therapeutically effective amounts of cyclic G-2-AllylP may range from 0.001 to 600 milligrams per kilogram mass of the animal, being appropriate for administration by methods such as oral, systemic (e.g. transdermal), scarification, or parenteral (e.g. intravenous) administration. A person of ordinary skill in the art will be able without undue experimentation, having regard to that skill and this disclosure, to determine a therapeutically effective amount of a compound.

cG-2-AllylP, cyclic cyclohexyl-G-2-MeP, cyclic cyclopentyl-G-2-MeP and/or related cyclic piperidines and other cGP related compounds may be administered peripherally via any peripheral route known in the art. These can include parenteral routes for example injection into the peripheral circulation, subcutaneous, intraorbital, ophthalmic, intraspinal, intracisternal, topical, infusion (using e.g. slow release devices or minipumps such as osmotic pumps or skin patches), implant, aerosol, inhalation, scarification, intraperitoneal, intracapsular, intramuscular, intranasal, oral, buccal, transdermal, pulmonary, rectal or vaginal. The compositions can be formulated for parenteral administration to humans or other mammals in therapeutically effective amounts (e.g. amounts which eliminate or reduce the patient's pathological condition) to provide therapy for the neurological diseases described above.

Desirably, cG-2-AllylP, cyclic cyclohexyl-G-2-MeP, cyclic cyclopentyl-G-2-MeP and/or related cyclic piperidines can be administered orally in an aqueous solution.

Other convenient administration routes include subcutaneous injection (e.g. dissolved in a physiologically compatible carrier such as 0.9% sodium chloride)

By "directly or indirectly via the circulation," we mean administration of cG-2-AllylP, cyclic cyclohexyl-G-2-MeP, cyclic cyclopentyl-G-2-MeP or related cyclic piperidines to any tissue that has blood flow sufficient to deliver the agent into the circulation. Non-limiting examples include the skin, nose, pharynx, gastrointestinal tract, or other such tissue. When administered to such a tissue, the agent is absorbed by the tissue, where the agent enters the interstitial fluid of the tissue, and subsequently is absorbed by venules, capillaries, arterioles or lymph ducts. The agent is then carried into the general systemic circulation, where it can be delivered to the affected site, including the brain. When the agent is administered subcutaneously or peritoneally, the agent is absorbed by an adjacent tissue, and the agent then enters the circulation locally, and subsequently is delivered to the general circulation, where it can be transported to the brain. When the agent approaches the blood-brain barrier, the agent then can diffuse into the brain, either to neural tissue, or into the cerebrospinal fluid, where it can be delivered to neural tissues.

The effective amount of compound in the CNS may be increased by administration of a pro-drug form of a compound, which comprises a compound of the invention and a carrier, where the carrier is joined to a compound of the invention by a linkage which is susceptible to cleavage or digestion within the patient. Any suitable linkage can be employed which will be cleaved or digested following administration.

However, there is no intention on the part of the applicants to exclude other forms of administration.

In further embodiments of the disclosure, restoring neurological function in an animal can comprise administering a therapeutic amount of cyclic G-2-AllylP in combination with another agent, selected from, for example, growth factors and associated derivatives (insulin-like growth factor-I (IGF-I), insulin-like growth factor-II (IGF-II), transforming growth factor-$\beta$1, activin, growth hormone, nerve growth factor, growth hormone binding protein, IGF-binding proteins, IGFBP-3, basic fibroblast growth factor, acidic fibroblast growth factor, the hst/Kfgk gene product, FGF-3, FGF-4, FGF-6, keratinocyte growth factor, androgen-induced growth factor, int-2, fibroblast growth factor homologous factor-1 (FHF-1), FHF-2, FHF-3 and FHF-4, keratinocyte growth factor 2, glial-activating factor, FGF-10, FGF-16, ciliary neurotrophic factor, brain derived growth factor, neurotrophin 3, neurotrophin 4, bone morphogenetic protein 2 (BMP-2), glial-cell line derived neurotrophic factor, activity-dependent neurotrophic factor, cytokine leukaemia inhibiting factor, oncostatin M, interleukin), $\alpha$-interferon, $\beta$-interferon, $\gamma$-interferon, or consensus interferon, and TNF-$\alpha$. Other forms of therapeutic agents include, clomethiazole; kynurenic acid, Semax, tacrolimus, L-threo-1-phenyl-2-decanoylamino-3-morpholino-1-propanol, andrenocorticotropin-(4-9) analog (ORG 2766), dizolcipine (MK-801), selegiline; glutamate antagonists, NPS1506, GV1505260, MK-801, GV150526; AMPA antagonists, 2,3-dihydroxy-6-nitro-7-sulfamoylbenzo(f)quinoxaline (NBQX), LY303070, LY300164, anti-inflammatory agents directed against the addressin MAdCAM-1 and/or its integrin $\alpha$4 receptors ($\alpha$4$\beta$1 and $\alpha$4$\beta$7), anti-MAdCAM-1mAb MECA-367 (ATCC accession no. HB-9478).

cG-2-AllylP, cyclic cyclohexyl-G-2-MeP, cyclic cyclopentyl-G-2-MeP and/or related cyclic piperidines and other cGP related compounds are suitably administered by a sustained-release system. Suitable examples of sustained-release compositions include semi-permeable polymer matrices in the form of shaped articles, e.g., films, or microcapsules. Sustained-release matrices include polylactides (U.S. Pat. No. 3,773,919; EP 58,481), copolymers of L-glutamic acid and gamma-ethyl-L-glutamate (Sidman et al., 1983, *Biopolymers:* 22: 547-56), poly(2-hydroxyethyl methacrylate) (Langer et al., 1981, *J. Biomed. Mater. Res.:* 15: 267), ethylene vinyl acetate (Langer et al., 1981, *J. Biomed. Mater. Res.:* 15: 267), or poly-D-(–)-3-hydroxybutyric acid (EP 133,988). Sustained-release compositions also include a liposomally entrapped compound. Liposomes containing the compound are prepared by methods known per se: DE 3,218,121, EP 52,322, EP 36,676, EP 88,046, EP 143,949, EP 142,641, Japanese Pat. Appln. 83-118008, U.S. Pat. Nos. 4,485,045 and 4,544,545, and EP 102,324. Ordinarily, the liposomes are of the small (from or about 200 to 800 Angstroms) unilamellar type in which the lipid content is greater than about 30 mol percent cholesterol, the selected proportion being adjusted for the most efficacious therapy.

For parenteral administration, in one embodiment cG-2-AllylP, cyclic cyclohexyl-G-2-MeP, cyclic cyclopentyl-G-2-MeP and/or related cyclic piperidines can be formulated generally by mixing each at the desired degree of purity, in a unit dosage injectable form (solution, suspension, or emulsion), with a pharmaceutically, or parenterally, acceptable carrier, i.e., one that is non-toxic to recipients at the dosages and concentrations employed and is compatible with other ingredients of the formulation.

For delivery of a compound of this invention to a mucosal tissue, one can incorporate the compound into a gel formulation. Once delivered to the mucosa (e.g., oral cavity, gastrointestinal tract, rectum), the agent can diffuse out of the gel, or the gel can be degraded, thereby releasing the agent into the tissue, where it can be absorbed into the circulation. Exemplary gel formulations can include those made with carboxypolysaccharides such as carboxymethyl cellulose, carboxyethyl cellulose, chitin, chitosan, starch, cellulose, proteins such as hyaluronic acid, or other polymers, such as polyvinylpyrollidine, polyvinyl alcohols, as well as other gel materials known in the art Generally, the formulations are prepared by contacting cG-2-AllylP, cyclic cyclohexyl-G-2-MeP, cyclic cyclopentyl-G-2-MeP and/or related cyclic piperidines with liquid carriers or finely divided solid carriers or both. Then, if necessary, the product is shaped into the desired formulation. Preferably the carrier is a parenteral carrier, more preferably a solution that is isotonic with the blood of the recipient. Examples of such carrier vehicles include water, saline, Ringer's solution, a buffered solution, and dextrose solution. Non-aqueous vehicles such as fixed oils and ethyl oleate are also useful herein.

A carrier suitably contains minor amounts of additives such as substances that enhance isotonicity and chemical stability. Such materials are non-toxic to recipients at the dosages and concentrations employed, and include buffers such as phosphate, citrate, succinate, acetic acid, and other organic acids or their salts; antioxidants such as ascorbic acid; low molecular weight (less than about ten residues) polypeptides, e.g., polyarginine or tripeptides; proteins, such as serum albumin, gelatin, or immunoglobulins; hydrophilic polymers such as polyvinylpyrrolidone; glycine; amino acids such as glutamic acid, aspartic acid, histidine, or arginine; monosaccharides, disaccharides, and other carbohydrates including cellulose or its derivatives, glucose, mannose, trehalose, or dextrins; chelating agents such as EDTA; sugar alcohols such as mannitol or sorbitol; counterions such as sodium; non-ionic surfactants such as polysorbates, poloxamers, or polyethylene glycol (PEG); and/or neutral salts, e.g., NaCl, KCl, MgCl$_2$, CaCl$_2$, etc.

cG-2-AllylP, cyclic cyclohexyl-G-2-MeP, cyclic cyclopentyl-G-2-MeP and/or related cyclic piperidines and other cGP compounds typically formulated in such vehicles at a pH of from or about 4.5 to 8. It will be understood that use of certain of the foregoing excipients, carriers, or stabilizers will result in the formation of salts of the compound. The final preparation may be a stable liquid or lyophilized solid.

Formulations of cG-2-AllylP, cyclic cyclohexyl-G-2-MeP, cyclic cyclopentyl-G-2-MeP and/or related cyclic piperidines in pharmaceutical compositions can also include adjuvants. Typical adjuvants which may be incorporated into tablets, capsules, and the like are a binder such as acacia, corn starch, or gelatin; an excipient such as microcrystalline cellulose; a disintegrating agent like corn starch or alginic acid; a lubricant such as magnesium stearate; a sweetening agent such as sucrose or lactose; a flavouring agent such as peppermint, wintergreen, or cherry. When dosage forms are tablets, cG-2-AllylP, cyclic cyclohexyl-G-2-MeP, cyclic cyclopentyl-G-2-MeP and/or related cyclic piperidine compositions can include binders and optionally, a smooth coating. When the dosage form is a capsule, in addition to the above materials, it may also contain a liquid carrier such as a fatty oil. Other materials of various types may be used as coatings or as modifiers of the physical form of the dosage unit. A syrup or elixir may contain the active compound, a sweetener such as sucrose, preservatives like propyl paraben, a colouring agent, and a flavouring agent such as cherry. Sterile compositions for injection can be formulated according to conventional pharmaceutical practice. For example, dissolution or suspension of the active compound in a vehicle such as water or naturally occurring vegetable oil like sesame, peanut, or cottonseed oil or a synthetic fatty vehicle like ethyl oleate or the like may be desired. Buffers, preservatives, antioxidants, and the like can be incorporated according to accepted pharmaceutical practice.

A pharmaceutical formulation containing cG-2-AllylP, cyclic cyclohexyl-G-2-MeP, cyclic cyclopentyl-G-2-MeP and/or related cyclic piperidines ordinarily will be stored in unit or multi-dose containers, for example, in sealed ampoules or vials, as an aqueous solution or as a lyophilized formulation for reconstitution. As an example of a lyophilized formulation, 10 mL vials are filled with 5 mL of sterile-filtered 1% (w/v) aqueous solution of compound, and the resulting mixture is lyophilized. The solution is prepared by reconstituting the lyophilized compound using bacteriostatic Water-for-Injection. It can be readily appreciated that other dosage forms and types of preparations can be used, and all are considered to be part of this disclosure.

Preparation of the Compounds

Starting materials and reagents used in preparing cG-2-AllylP, cyclic cyclohexyl-G-2-MeP, cyclic cyclopentyl-G-2-MeP and/or related cyclic piperidines are either available from commercial suppliers such as Aldrich Chemical Company (Milwaukee, Wis.), Bachem (Torrance, Calif.), Sigma (St. Louis, Mo.), or are prepared by methods well known to the person of ordinary skill in the art following procedures described in such references as Fieser and Fieser's Reagents for Organic Synthesis, vols 1-17, John Wiley and Sons, New York, N.Y., 1991; Rodd's Chemistry of Carbon Compounds, vols. 1-5 and supplements, Elsevier Science Publishers, 1989; Organic Reactions, vols. 1-40, John Wiley and Sons, New York, N.Y., 1991; March J; Advanced Organic Chemistry, 4$^{th}$ ed. John Wiley and Sons, New York, N.Y., 1992; and Larock: Comprehensive Organic Transformations, VCH Publishers, 1989. In most instances, amino acids and their esters or amides, and protected amino acids, are widely commercially available; and the preparation of modified amino acids and their amides or esters are extensively described in the chemical and biochemical literature and thus well-known to persons of ordinary skill in the art.

Starting materials, intermediates, and final products this disclosure may be isolated and purified using conventional techniques, including filtration, distillation, crystallization, chromatography, and the like. They may be characterized using conventional methods, including physical constants and spectral data.

Cyclic G-2-AllylP is a cyclic dipeptide (bicyclic 2,5-diketopiperazine), and is a member of the class of compounds known as cyclic GPs ("cGP"). In general, cGPs and cyclic G-2-AllylP may be prepared by methods such as are already well-known to persons of ordinary skill in the art of peptide and modified peptide synthesis, following the reaction schemes set forth herein, or by following other methods well-known to those of ordinary skill in the art of the synthesis of peptides and analogues. See for example, Bodanzsky: Principles of Peptide Synthesis, Berlin, New York: Springer-Verlag 1993.

Synthesis of the diketopiperazine compounds of this disclosure may be by solution-phase synthesis or via the solid-phase synthesis method exemplified by Merrifield et al. 1963 *J. Amer. Chem. Soc.:* 85, 2149-2156. Solid phase synthesis may be performed using commercial peptide synthesizers, such as the Applied Biosystems Model 430A, using the protocols established for the instrument.

Specific examples of diketopiperazine synthesis can be found in Fischer, 2003, *J. Peptide Science:* 9: 9-35 and references therein. A person of ordinary skill in the art will have no difficulty, taking account of that skill and the knowledge available, and of this disclosure, in developing one or more suitable synthetic methods for compounds of this invention.

The choice of appropriate protecting groups for the method chosen (solid-phase or solution-phase), and of appropriate substrates if solid-phase synthesis is used, will be within the skill of a person of ordinary skill in the art. Appropriate protecting groups for peptide synthesis include t-butyloxycarbonyl (Boc), fluorenylmethyloxycarbonyl (Fmoc), Benzyl (Bzl), t-amyloxycarbonyl (Aoc), tosyl (Tos), benzyloxycarbonyl (Z or Cbz), o-bromo-benzyloxycarbonyl (BrZ) and the like. Additional protecting groups are identified in Goodman M. (ed.), "Synthesis of Peptides and Peptidomimetics" in Methods of organic chemistry (Houben-Weyl) (Workbench Edition, E22a,b,c,d,e; 2004; Georg Thieme Verlag, Stuttgart, New York).

The choice of coupling agent for the method chosen will also be within the skill of a person of ordinary skill in the art. Suitable coupling agents include DCC (N, N'-Dicyclohexylcarbodiimide), Bop (Benzotriazole-1-yl-oxy-tris-(dimethylamino)-phosphonium hexafluorophosphate), PyBop (Benzotriazol-1-yl-oxytripyrrolidinophosphonium hexafluorophosphate), BopCl (bis(2-oxo-3-oxazolidinyl) phosphinic chloride), 2-Chloro-1,3-dimethylimidazolidinium hexafluorophosphate (CIP) and the like. Other compounds may be used in the synthesis e.g. to prevent racemisation, such as HOBt (N-Hydroxybenzotriazole) and HOAt (1-Hydroxy-7-azabenzotriazole).

Embodiments

The specific embodiments presented below are not intended to be limiting to the scope of the invention. Persons of skill in the art can create other embodiments by incorporating one or more of the elements in the listing below into combinations not specifically set forth herein. All such embodiments are considered to be within the scope of the invention.

Embodiment 1. A method for treating a symptom of PTHS in an animal suffering from such a disorder, comprising administering to the animal, a compound having the formula:

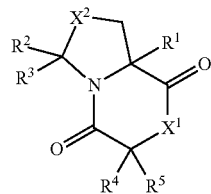

or a pharmaceutically acceptable salt or hydrate thereof, wherein

X$^1$ is selected from the group consisting of NR', O and S;
X$^2$ is selected from the group consisting of CH$_2$, NR', O and S;
R$^1$, R$^2$, R$^3$, R$^4$ and R$^5$ are independently selected from the group consisting of —H, —OR', —SR', —NR'R', —NO$_2$, —CN, —C(O)R', —C(O)OR', —C(O)NR'R', —C(NR')NR'R', trihalomethyl, halogen, alkyl, substituted alkyl, heteroalkyl, substituted heteroalkyl, alkenyl, substituted alkenyl, alkynyl, substituted alkynyl, aryl, substituted aryl, heteroaryl, substituted heteroaryl, arylalkyl, substituted arylalkyl, heteroarylalkyl and substituted heteroarylalkyl; each R' is independently selected from the group consisting of —H, alkyl, heteroalkyl, alkenyl, alkynyl, aryl, arylalkyl, heteroaryl and heteroarylalkyl;
or R$^4$ and R$^5$ taken together are —CH$_2$—(CH$_2$)$_n$—CH$_2$— where n is an integer from 0-6;
or R$^2$ and R$^3$ taken together are —CH$_2$—(CH$_2$)$_n$—CH$_2$— where n is an integer from 0-6;
with the proviso that when R$^1$=methyl and R$^2$=R$^3$=R$^4$=H then R$^5$≠benzyl and;
when R$^1$=H, at least one of R$^2$ and R$^3$≠H.

Embodiment 2. A method for treating a symptom of PTHS in an animal suffering from such a disorder, comprising administering to the animal, a compound has the formula:

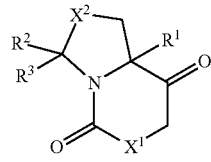

or a pharmaceutically acceptable salt or hydrate thereof, wherein

X$^1$ is selected from the group consisting of NR', O and S;
X$^2$ is selected from the group consisting of CH$_2$, NR', O and S;
R$^1$, R$^2$ and R$^3$ are independently selected from the group consisting of group consisting of —H, —OR', —SR', —NR'R', —NO$_2$, —CN, —C(O)R', —C(O)OR', —C(O)NR'R', —C(NR')NR'R', trihalomethyl, halogen, alkyl, substituted alkyl, heteroalkyl, substituted heteroalkyl, alkenyl, substituted alkenyl, alkynyl, substituted alkynyl, aryl, substituted aryl, heteroaryl, substituted heteroaryl, arylalkyl, substituted arylalkyl, heteroarylalkyl and substituted heteroarylalkyl; each R' is independently selected from the group consisting of —H, alkyl, heteroalkyl, alkenyl, alkynyl, aryl, arylalkyl, heteroaryl and heteroarylalkyl;
or R$^2$ and R$^3$ taken together are —CH$_2$—(CH$_2$)$_n$—CH$_2$— where n is an integer from 0-6;
with the proviso that at least one R≠H.

Embodiment 3. A method for treating a symptom of PTHS in an animal suffering from such a disorder, comprising administering to the animal, a compound has the formula:

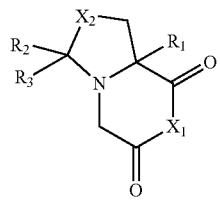

or a pharmaceutically acceptable salt or hydrate thereof, wherein

X$^1$ is selected from the group consisting of NR', O and S;
X$^2$ is selected from the group consisting of CH$_2$, NR', O and S;
R$^1$, R$^2$ and R$^3$ are independently selected from the group consisting of group consisting of —H, —OR', —SR', —NR'R', —NO$_2$, —CN, —C(O)R', —C(O)OR', —C(O)NR'R', —C(NR')NR'R', trihalomethyl, halogen, alkyl, substituted alkyl, heteroalkyl, substituted heteroalkyl, alkenyl, substituted alkenyl, alkynyl, substituted alkynyl, aryl, substituted aryl, heteroaryl, substituted heteroaryl, arylalkyl, substituted arylalkyl, heteroarylalkyl and substituted heteroarylalkyl; each R' is independently selected from the group consisting of —H, alkyl, heteroalkyl, alkenyl, alkynyl, aryl, arylalkyl, heteroaryl and heteroarylalkyl;
or R$^2$ and R$^3$ taken together are —CH$_2$—(CH$_2$)$_n$—CH$_2$— where n is an integer from 0-6.

Embodiment 4. A method for treating a symptom of PTHS in an animal suffering from such a disorder, comprising administering to the animal, a compound of the formula:

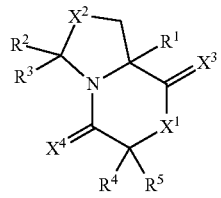

or a pharmaceutically acceptable salt or hydrate thereof, wherein

X$^1$, X$^3$, and X$^4$ are independently selected from the group consisting of S, O, and NH;
X$^2$ is selected from the group consisting of S, O, CH$_2$ and NH;
R$^1$, R$^2$, R$^3$, R$^4$ and R$^5$ are independently selected from the group consisting of —H, —OR', —SR', —NR'R', —NO$_2$, —CN, —C(O)R', —C(O)OR', —C(O)NR'R', —C(NR')NR'R', trihalomethyl, halogen, alkyl, substituted alkyl, heteroalkyl, substituted heteroalkyl, alkenyl, substituted alkenyl, alkynyl, substituted alkynyl, aryl, substituted aryl, heteroaryl, substituted heteroaryl, arylalkyl, substituted arylalkyl, heteroarylalkyl and substituted heteroarylalkyl; each R' is independently selected from the group consisting of —H, alkyl, heteroalkyl, alkenyl, alkynyl, aryl, arylalkyl, heteroaryl and heteroarylalkyl;

or $R^4$ and $R^5$ taken together are —$CH_2$—$(CH_2)_n$—$CH_2$— where n is an integer from 0-6;

or $R^2$ and $R^3$ taken together are —$CH_2$—$(CH_2)_n$—$CH_2$— where n is an integer from 0-6;

with the proviso that at least one R≠H and that both $X^3$ and $X^4$≠O.

Embodiment 5. A method for treating a symptom of PTHS in an animal suffering from such a disorder, comprising administering to the animal, a compound of the formula:

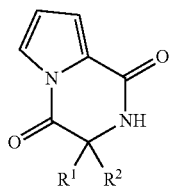

or a pharmaceutically acceptable salt or hydrate thereof, wherein $R^1$ and $R^2$ are independently selected from the group consisting of group consisting of —H, —OR', —SR', —NR'R', —$NO_2$, —CN, —C(O)R', —C(O)OR', —C(O)NR'R', —C(NR')NR'R', trihalomethyl, halogen, alkyl, substituted alkyl, heteroalkyl, substituted heteroalkyl, alkenyl, substituted alkenyl, alkynyl, substituted alkynyl, aryl, substituted aryl, heteroaryl, substituted heteroaryl, arylalkyl, substituted arylalkyl, heteroarylalkyl and substituted heteroarylalkyl; each R' is independently selected from the group consisting of —H, alkyl, heteroalkyl, alkenyl, alkynyl, aryl, arylalkyl, heteroaryl and heteroarylalkyl;

or $R^1$ and $R^2$ taken together are —$CH_2$—$(CH_2)_n$—$CH_2$— where n is an integer from 0-6.

Embodiment 6. A method for treating a symptom of PTHS in an animal suffering from such a disorder, comprising administering to the animal, a compound of the formula:

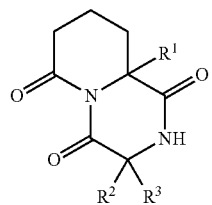

or a pharmaceutically acceptable salt or hydrate thereof, wherein $R^1$, $R^2$ and $R^3$ are independently selected from the group consisting of group consisting of —H, —OR', —SR', —NR'R', —$NO_2$, —CN, —C(O)R', —C(O)OR', —C(O)NR'R', —C(NR')NR'R', trihalomethyl, halogen, alkyl, substituted alkyl, heteroalkyl, substituted heteroalkyl, alkenyl, substituted alkenyl, alkynyl, substituted alkynyl, aryl, substituted aryl, heteroaryl, substituted heteroaryl, arylalkyl, substituted arylalkyl, heteroarylalkyl and substituted heteroarylalkyl; each R' is independently selected from the group consisting of —H, alkyl, heteroalkyl, alkenyl, alkynyl, aryl, arylalkyl, heteroaryl and heteroarylalkyl;

or $R^2$ and $R^3$ taken together are —$CH_2$—$(CH_2)_n$—$CH_2$— where n is an integer from 0-6.

Embodiment 7. A method for treating a symptom of PTHS in an animal suffering from such a disorder, comprising administering to the animal, a compound of the formula:

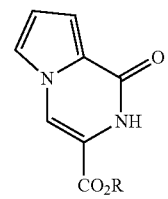

or a pharmaceutically acceptable salt or hydrate thereof, wherein

R is selected from the group consisting of alkyl, substituted alkyl, heteroalkyl, substituted heteroalkyl, alkenyl, substituted alkenyl, alkynyl, substituted alkynyl, aryl, substituted aryl, heteroaryl, substituted heteroaryl, arylalkyl, substituted arylalkyl, heteroarylalkyl and substituted heteroarylalkyl.

Embodiment 8. The method of any of embodiments 1 to 4 or 6 where $R^1$=methyl.

Embodiment 9. The method of any of embodiments 1 to 4 or 6 where $R^1$=allyl.

Embodiment 10. The method of any of embodiments 1 to 4 where $R^2$=$R^3$=methyl and $X^2$=S.

Embodiment 11. The method of embodiment 1 where $R^1$=allyl, $R^2$=$R^3$=$R^4$=$R^5$=H, $X^1$=NH, $X^2$=$CH_2$.

Embodiment 12. The method of embodiment 1 where $R^1$=methyl, $R^2$=$R^3$=H, $R^4$ and $R^5$ taken together are —$CH_2$—$(CH_2)_3$—$CH_2$—, $X^1$=NH, $X^2$=$CH_2$.

Embodiment 13. The method of embodiment 1 where $R^1$=methyl, $R^2$=$R^3$=H, $R^4$ and $R^5$ taken together are —$CH_2$—$(CH_2)_2$—$CH_2$—, $X^1$=NH, $X^2$=$CH_2$.

Embodiment 14. The method of any of embodiments 1 to 13, further comprising administering a pharmaceutically acceptable excipient.

Embodiment 15. The method of any of embodiments 1 to 13, further comprising administering a pharmaceutically acceptable excipient and a binder.

Embodiment 16. The method of any of embodiments 1 to 13, further comprising administering a pharmaceutically acceptable excipient and a capsule.

Embodiment 17. The method of any of embodiments 1 to 13, further comprising administering at least one other anti-apoptotic, anti-necrotic or neuroprotective agent.

Embodiment 18. The method of embodiment 17 where the neuroprotective agent is selected from selected from growth factors and associated derivatives (insulin-like growth factor-I [IGF-I], insulin-like growth factor-II [IGF-II], transforming growth factor-β1, activin, growth hormone, nerve growth factor, growth hormone binding protein, IGF-binding proteins, IGFBP-3, basic fibroblast growth factor, acidic fibroblast growth factor, the hst/Kfgk gene product, FGF-3, FGF-4, FGF-6, keratinocyte growth factor, androgen-induced growth factor, int-2, fibroblast growth factor homologous factor-1 (FHF-1), FHF-2, FHF-3 and FHF-4, keratinocyte growth factor 2, glial-activating factor, FGF-10 and FGF-16, ciliary neurotrophic factor, brain derived growth factor, neurotrophin 3, neurotrophin 4, bone morphogenetic protein 2 [BMP-2], glial-cell line derived neurotrophic factor, activity-dependent neurotrophic factor, cytokine leukaemia inhibiting factor, oncostatin M, an interleukin, α-interferon, β-interferon, γ-interferon, consensus interferon, TNF-α, clomethiazole; kynurenic acid, Semax, tacrolimus, L-threo-1-phenyl-2-decanoylamino-3-morpholino-1-propanol, adrenocorticotropin-(4-9) analogue [ORG 2766], dizolcipine [MK-801], selegiline, a glutamate antagonist, an AMPA antagonist, and an anti-inflammatory agent.

Embodiment 19. The method of embodiment 18 wherein said glutamate and/or NMDA antagonist is selected from the group consisting of NPS1506, GV1505260, MK-801, and GV150526.

Embodiment 20. The method of embodiment 18 wherein said AMPA antagonist is selected from the group consisting of 2,3-dihydroxy-6-nitro-7-sulfamoylbenzo(f)quinoxaline (NBQX), LY303070 and LY300164.

Embodiment 21. The method of embodiment 18, wherein said anti-inflammatory agent is selected from the group consisting of an anti-MAdCAM-1 antibody and an antibody against an integrin α4β1 receptor and an integrin α4β7 receptor.

Embodiment 22. The method of embodiment 21 wherein said anti-MAdCAM-1 antibody is MECA-367.

Embodiment 23. The method of embodiment 1, wherein said compound is cyclic G-2-AllylP.

Embodiment 24. The method of embodiment 1, wherein said compound is cyclic cyclohexyl-G-2MeP.

Embodiment 25. The method of embodiment 1, wherein said compound is cyclic cyclopentyl-G-2MeP.

Embodiment 26. A method for treating a symptom of PTHS in an animal suffering from such a disorder, comprising administering to the animal, a pharmaceutically effective amount of cyclic Glycyl-2-Allyl Proline (cG-2-AllylP) to said mammal.

Embodiment 27. The method of embodiment 26, wherein said cG-2-AllylP comprises an aqueous solution and one or more pharmaceutically acceptable excipients, additives, carriers or adjuvants.

Embodiment 28. The method of embodiment 26, further comprising one or more excipients, carriers, additives, adjuvants or binders in a tablet or capsule.

Embodiment 29. The method of any of embodiments 1 to 30, where the compound is administered either directly or indirectly via the circulation.

Embodiment 30. The method of any of embodiments 1 to 29, where said compound is administered via an oral, intraperitoneal, intravascular, peripheral circulation, subcutaneous, intraorbital, ophthalmic, intraspinal, intracisternal, topical, infusion, implant, aerosol, inhalation, scarification, intraperitoneal, intracapsular, intramuscular, intranasal, buccal, transdermal, pulmonary, rectal, or vaginal route.

Embodiment 31. The method of any of embodiments 1 to 30, where said effective amount has a lower limit of about 0.001 milligrams per kilogram mass (mg/kg) of the animal and an upper limit of about 200 mg/kg.

Embodiment 32. The method of any of embodiments 1 to 31, where assessment of efficacy is via measurement of phosphorylated ERK (pERK) or phosphorylated Akt (pAkt) in lymphocytes of the animal, where normalization of either pERK or pAkt indicates reduction in severity of said disorder.

Embodiment 33. The method of any of embodiments 1 to 32, wherein said treatment produces an improvement in a symptom of PTHS as assessed using one or more clinical tests selected from the group consisting of the Aberrant Behavior Checklist Community Edition (ABC), Vineland Adaptive Behavior Scales, Clinical Global Impression of Severity (CGI-S), Clinical Global Impression Improvement (CGI-I), the Caregiver Strain Questionnaire (CSQ), or one or more physiological tests selected from the group consisting of electroencephalogram (EEG) spike frequency, overall power in frequency bands of an EEG, hemispheric coherence of EEG frequencies, stereotypic hand movement, QTc and heart rate variability (HRV), abnormal expression or activation of ERK1/2 and Akt, abnormal expression of growth-associated protein-43 (GAP-43), abnormal expression of synaptophysin (SYN), respiratory irregularities and coupling of cardiac and respiratory function compared to control animals not suffering from said disorder.

Embodiment 34. The method of any of embodiments 1-33, where said symptom of PTHS is cognitive impairment or cognitive dysfunction, one or more signs or symptoms of memory loss, loss of spatial orientation, decreased ability to learn, decreased ability to form short- or long-term memory, decreased episodic memory, decreased ability to consolidate memory, decreased spatial memory, decreased synaptogenesis, decreased synaptic stability, deficits in executive function, deficits in cognitive mapping and scene memory, deficits in declarative and relational memory, decreased rapid acquisition of configural or conjunctive associations, decreased context-specific encoding and retrieval of specific events, decreased episodic and/or episodic-like memory, anxiety, abnormal fear conditioning, abnormal social behaviour, repetitive behaviour, abnormal nocturnal behavior, seizure activity, abnormal locomotion, abnormal expression or activation of ERK1/2 and Akt, and bradycardia.

Embodiment 35. A method for detecting presence of, severity, or evaluation of therapeutic efficacy of any of the preceding embodiments, comprising measuring expression of Phospho-ERK1/2 or Phospho-Akt in a peripheral lymphocyte of a subject with PTHS compared to the expression of Phospho-ERK1/2 or Phospho-Akt in a peripheral lymphocyte of a group of subjects not having PTHS, or to the expression Phospho-ERK1/2 or Phospho-Akt in a peripheral lymphocyte of the subject before treatment.

Embodiment 36. Use of a compound in the manufacture of a medicament to treat a symptom of Pitt-Hopkins Syndrome, said compound being a pharmaceutically effective amount of a compound comprising cyclic Glycyl-2-Allyl Proline (cG-2-AllylP), cyclic cyclohexyl-G-2MeP, or cyclic cyclopentyl-G-2MeP.

Embodiment 37. The use of Embodiment 36, wherein said compound is cyclic cyclohexyl-G-2MeP.

Embodiment 38. The use of Embodiment 36, wherein said compound is cyclic G-2-allylP.

Embodiment 39. The use of Embodiment 36, wherein said compound is cyclic cyclopentyl-G-2MeP.

Embodiment 40. Use of a compound in the manufacture of a medicament for treating a symptom of Pitt Hopkins Syndrome in a mammal suffering from such a disorder, wherein said compound has the formula:

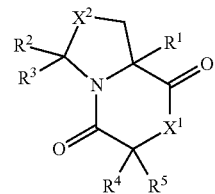

or a pharmaceutically acceptable salt or hydrate thereof, wherein

X$^1$ is selected from the group consisting of NR', O and S;

X$^2$ is selected from the group consisting of CH$_2$, NR', O and S;

R$^1$, R$^2$, R$^3$, R$^4$ and R$^5$ are independently selected from the group consisting of —H, —OR', —SR', —NR'R', —NO$_2$, —CN, —C(O)R', —C(O)OR', —C(O)NR'R', —C(NR')NR'R', trihalomethyl, halogen, alkyl, substituted alkyl, heteroalkyl, substituted heteroalkyl, alkenyl, substituted alkenyl, alkynyl, substituted alkynyl, aryl, substituted aryl, heteroaryl, substituted heteroaryl, arylalkyl, substituted arylalkyl, heteroarylalkyl and substituted heteroarylalkyl; each R' is independently selected from the group consisting of —H, alkyl, heteroalkyl, alkenyl, alkynyl, aryl, arylalkyl, heteroaryl and heteroarylalkyl;

or R$^4$ and R$^5$ taken together are —CH$_2$—(CH$_2$)$_n$—CH$_2$— where n is an integer from 0-6;

or R$^2$ and R$^3$ taken together are —CH$_2$—(CH$_2$)$_n$—CH$_2$— where n is an integer from 0-6;

with the proviso that when R$^1$=methyl and R$^2$=R$^3$=R$^4$=H then R$^5$≠benzyl and;

when R$^1$=H, at least one of R$^2$ and R$^3$≠H.

Embodiment 41. The use of Embodiment 40, where R$^1$=methyl.

Embodiment 42. The use of Embodiment 40, where R$^1$=allyl.

Embodiment 43. The use of Embodiment 40, where R$^2$=R$^3$=methyl and X$^2$=S.

Embodiment 44. The use of Embodiment 40, where R$^1$=allyl, R$^2$=R$^3$=R$^4$=R$^5$=H, X$^1$=NH, X$^2$=CH$_2$.

Embodiment 45. The use of Embodiment 40, where R$^1$=methyl, R$^2$=R$^3$=H, R$^4$ and R$^5$ taken together are —CH$_2$—(CH$_2$)$_3$—CH$_2$—, X$^1$=NH, X$^2$=CH$_2$.

Embodiment 46. The use of Embodiment 40, where R$^1$=methyl, R$^2$=R$^3$=H, R$^4$ and R$^5$ taken together are —CH$_2$—(CH$_2$)$_2$—CH$_2$—, X$^1$=NH, X$^2$=CH$_2$.

Embodiment 47. The use of any of Embodiments 40 to 46, where the use further comprises said compound in a pharmaceutically acceptable excipient, or in a gel.

Embodiment 48. The use of any of Embodiments 40 to 47, where the use further comprises said compound with a pharmaceutically acceptable excipient and a binder.

Embodiment 49. The use of any of Embodiments 40 to 48, where the use further comprises said compound with a pharmaceutically acceptable excipient, or in a capsule.

Embodiment 50. The use of any of Embodiments 40 to 49, further comprising least one anti-apoptotic compound, anti-necrotic compound, neuroprotective agent or an anti-inflammatory agent.

Embodiment 51. The use of Embodiment 50 where the anti-apoptotic compound, anti-necrotic compound, or neuroprotective agent is selected from the group consisting of insulin-like growth factor-I (IGF-I), insulin-like growth factor-II (IGF-II), transforming growth factor-β1, activin, growth hormone, nerve growth factor, growth hormone binding protein, IGFBP-3, basic fibroblast growth factor, acidic fibroblast growth factor, the hst/Kfgk gene product, FGF-3, FGF-4, FGF-6, keratinocyte growth factor, androgen-induced growth factor, int-2, fibroblast growth factor homologous factor-1 (FHF-1), FHF-2, FHF-3, FHF-4, keratinocyte growth factor 2, glial-activating factor, FGF-10, FGF-16, ciliary neurotrophic factor, brain derived growth factor, neurotrophin 3, neurotrophin 4, bone morphogenetic protein 2 (BMP-2), glial-cell line derived neurotrophic factor, activity-dependent neurotrophic factor, cytokine leukaemia inhibiting factor, oncostatin M, an interleukin, α-interferon, β-interferon, γ-interferon, consensus interferon, TNF-α, clomethiazole; kynurenic acid, Semax, tacrolimus, L-threo-1-phenyl-2-decanoylamino-3-morpholino-1-propanol, adrenocorticotropin-(4-9) analogue (ORG 2766), dizolcipine [MK-801], selegiline, NPS1506, GV1505260, MK-801, GV150526, 2,3-dihydroxy-6-nitro-7-sulfamoyl-benzo(f)quinoxaline (NBQX), LY303070, LY300164, and the anti-MAdCAM-1 antibody MECA-367.

Embodiment 52. The use of any of Embodiments 40 to 50, said compound being cyclic G-2-AllylP.

Embodiment 53. The use of any of Embodiments 40 to 50, wherein said compound is cyclic cyclohexyl-G-2MeP.

Embodiment 54. The use of any of Embodiments 40 to 53, wherein said compound is cyclic cyclopentyl-G-2MeP.

Embodiment 55. The use of Embodiment 40, further comprising one or more excipients, carriers, additives, adjuvants or binders in a tablet.

Embodiment 56. The use of Embodiment 40, further comprising a microemulsion, coarse emulsion, or liquid crystal in a capsule.

Embodiment 57. A method for treating a mammal having Pitt Hopkins Syndrome, comprising administering to the mammal, a compound having the formula:

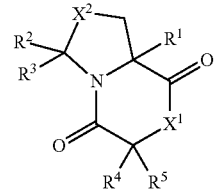

or a pharmaceutically acceptable salt or hydrate thereof, wherein

X$^1$ is selected from the group consisting of NR', O and S;

X$^2$ is selected from the group consisting of CH$_2$, NR', O and S;

R$^1$, R$^2$, R$^3$, R$^4$ and R$^5$ are independently selected from the group consisting of —H, —OR', —SR', —NR'R', —NO$_2$, —CN, —C(O)R', —C(O)OR', —C(O)NR'R', —C(NR')NR'R', trihalomethyl, halogen, alkyl, substituted alkyl, heteroalkyl, substituted heteroalkyl, alkenyl, substituted alkenyl, alkynyl, substituted alkynyl, aryl, substituted aryl, heteroaryl, substituted heteroaryl, arylalkyl, substituted arylalkyl, heteroarylalkyl and substituted heteroarylalkyl; each R' is independently selected from the group consisting of —H, alkyl, heteroalkyl, alkenyl, alkynyl, aryl, arylalkyl, heteroaryl and heteroarylalkyl;

or R$^4$ and R$^5$ taken together are —CH$_2$—(CH$_2$)$_n$—CH$_2$— where n is an integer from 0-6;

or R$^2$ and R$^3$ taken together are —CH$_2$—(CH$_2$)$_n$—CH$_2$— where n is an integer from 0-6;

with the proviso that when R$^1$=methyl and R$^2$=R$^3$=R$^4$=H then R$^5$≠benzyl and;

when R$^1$=H, at least one of R$^2$ and R$^3$≠H.

Embodiment 58. The method of Embodiment 57 where R$^1$=methyl.

Embodiment 59. The method of Embodiment 57 where R$^1$=allyl.

Embodiment 60. The method of Embodiment 57 where R$^2$=R$^3$=methyl and X$^2$=S.

Embodiment 61. The method of Embodiment 57 where R$^1$=allyl, R$^2$=R$^3$=R$^4$=R$^5$=H, X$^1$=NH, X$^2$=CH$_2$.

Embodiment 62. The method of Embodiment 57 where R$^1$=methyl, R$^2$=R$^3$=H, R$^4$ and R$^5$ taken together are —CH$_2$—(CH$_2$)$_3$—CH$_2$—, X$^1$=NH, X$^2$=CH$_2$.

Embodiment 63. The method of Embodiment 57 where R$^1$=methyl, R$^2$=R$^3$=H, R$^4$ and R$^5$ taken together are —CH$_2$—(CH$_2$)$_2$—CH$_2$—, X$^1$=NH, X$^2$=CH$_2$.

Embodiment 64. The method of Embodiment 57, where the method further comprises administering said compound along with a pharmaceutically acceptable excipient, or in a gel.

Embodiment 65. The method of Embodiment 57, where the method further comprises administering said compound along with a pharmaceutically acceptable excipient and a binder.

Embodiment 66. The method of Embodiment 57, where the method further comprises administering said compound along with a pharmaceutically acceptable excipient, or in a capsule.

Embodiment 67. The method of Embodiment 57, further comprising administering at least one anti-apoptotic compound, anti-necrotic compound, neuroprotective agent or an anti-inflammatory agent.

Embodiment 68. The method of Embodiment 67 where the anti-apoptotic compound, anti-necrotic compound, or neuroprotective agent is selected from the group consisting of insulin-like growth factor-I (IGF-I), insulin-like growth factor-II (IGF-II), transforming growth factor-β1, activin, growth hormone, nerve growth factor, growth hormone binding protein, IGFBP-3, basic fibroblast growth factor, acidic fibroblast growth factor, the hst/Kfgk gene product, FGF-3, FGF-4, FGF-6, keratinocyte growth factor, androgen-induced growth factor, int-2, fibroblast growth factor homologous factor-1 (FHF-1), FHF-2, FHF-3, FHF-4, keratinocyte growth factor 2, glial-activating factor, FGF-10, FGF-16, ciliary neurotrophic factor, brain derived growth factor, neurotrophin 3, neurotrophin 4, bone morphogenetic protein 2 (BMP-2), glial-cell line derived neurotrophic factor, activity-dependent neurotrophic factor, cytokine leukaemia inhibiting factor, oncostatin M, an interleukin, α-interferon, β-interferon, γ-interferon, consensus interferon, TNF-α, clomethiazole; kynurenic acid, Semax, tacrolimus, L-threo-1-phenyl-2-decanoylamino-3-morpholino-1-propanol, adrenocorticotropin-(4-9) analogue (ORG 2766), dizolcipine [MK-801], selegiline, NPS1506, GV1505260, MK-801, GV150526, 2,3-dihydroxy-6-nitro-7-sulfamoyl-benzo(f)quinoxaline (NBQX), LY303070, LY300164, and the anti-MAdCAM-1 antibody MECA-367.

Embodiment 69. The method of Embodiment 57, wherein said compound is cG-2-AllylP.

Embodiment 70. The method of Embodiment 57, wherein said compound is cyclic cyclohexyl-G-2MeP.

Embodiment 71. The method of Embodiment 57, wherein said compound is cyclic cyclopentyl-G-2MeP.

Embodiment 72. A composition to treat a symptom of Pitt-Hopkins Syndrome, said composition comprising a pharmaceutically effective amount of a compound comprising cyclic Glycyl-2-Allyl Proline (cG-2-AllylP), cyclic cyclohexyl-G-2MeP, or cyclic cyclopentyl-G-2MeP.

Embodiment 73. The composition of Embodiment 72, wherein said compound is cyclic cyclohexyl-G-2MeP.

Embodiment 74. The composition of Embodiment 72, wherein said compound is cyclic G-2-allylP.

Embodiment 75. The composition of Embodiment 72, wherein said compound is cyclic cyclopentyl-G-2MeP.

Embodiment 76. A composition for treating a symptom of Pitt Hopkins Syndrome in a mammal suffering from such a disorder, comprising a compound having the formula:

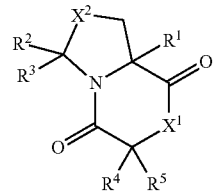

or a pharmaceutically acceptable salt or hydrate thereof, wherein

X$^1$ is selected from the group consisting of NR', O and S;

X$^2$ is selected from the group consisting of CH$_2$, NR', O and S;

R$^1$, R$^2$, R$^3$, R$^4$ and R$^5$ are independently selected from the group consisting of —H, —OR', —SR', —NR'R', —NO$_2$, —CN, —C(O)R', —C(O)OR', —C(O)NR'R', —C(NR')NR'R', trihalomethyl, halogen, alkyl, substituted alkyl, heteroalkyl, substituted heteroalkyl, alkenyl, substituted alkenyl, alkynyl, substituted alkynyl, aryl, substituted aryl, heteroaryl, substituted heteroaryl, arylalkyl, substituted arylalkyl, heteroarylalkyl and substituted heteroarylalkyl; each R' is independently selected from the group consisting of —H, alkyl, heteroalkyl, alkenyl, alkynyl, aryl, arylalkyl, heteroaryl and heteroarylalkyl;

or R$^4$ and R$^5$ taken together are —CH$_2$—(CH$_2$)$_n$—CH$_2$— where n is an integer from 0-6;

or R$^2$ and R$^3$ taken together are —CH$_2$—(CH$_2$)$_n$—CH$_2$— where n is an integer from 0-6;

with the proviso that when R$^1$=methyl and R$^2$=R$^3$=R$^4$=H then R$^5$≠benzyl and; when R$^1$=H, at least one of R$^2$ and R$^3$≠H.

Embodiment 77. The composition of Embodiment 76, where R$^1$=methyl.

Embodiment 78. The composition of Embodiment 76, where R$^1$=allyl.

Embodiment 79. The composition of Embodiment 76, where R$^2$=R$^3$=methyl and X$^2$=S.

Embodiment 80. The composition of Embodiment 76, where R$^1$=allyl, R$^2$=R$^3$=R$^4$=R$^5$=H, X$^1$=NH, X$^2$=CH$_2$.

Embodiment 81. The composition of Embodiment 76, where R$^1$=methyl, R$^2$=R$^3$=H, R$^4$ and R$^5$ taken together are —CH$_2$—(CH$_2$)$_3$—CH$_2$—, X$^1$=NH, X$^2$=CH$_2$.

Embodiment 82. The composition of Embodiment 76, where R$^1$=methyl, R$^2$=R$^3$=H, R$^4$ and R$^5$ taken together are —CH$_2$—(CH$_2$)$_2$—CH$_2$—, X$^1$=NH, X$^2$=CH$_2$.

Embodiment 83. The composition of any of Embodiments 76 to 82, further comprising said compound in a pharmaceutically acceptable excipient, or in a gel.

Embodiment 84. The composition of any of Embodiments 76 to 83, further comprising said compound with a pharmaceutically acceptable excipient and a binder.

Embodiment 85. The composition of any of Embodiments 76 to 84, where the use further comprises said compound with a pharmaceutically acceptable excipient, or in a capsule.

Embodiment 86. The composition of any of Embodiments 76 to 85, further comprising least one anti-apoptotic compound, anti-necrotic compound, neuroprotective agent or an anti-inflammatory agent.

Embodiment 87. The composition of Embodiment 86 where the anti-apoptotic compound, anti-necrotic compound, or neuroprotective agent is selected from the group consisting of insulin-like growth factor-I (IGF-I), insulin-like growth factor-II (IGF-II), transforming growth factor-β1, activin, growth hormone, nerve growth factor, growth hormone binding protein, IGFBP-3, basic fibroblast growth factor, acidic fibroblast growth factor, the hst/Kfgk gene product, FGF-3, FGF-4, FGF-6, keratinocyte growth factor, androgen-induced growth factor, int-2, fibroblast growth factor homologous factor-1 (FHF-1), FHF-2, FHF-3, FHF-4, keratinocyte growth factor 2, glial-activating factor, FGF-10, FGF-16, ciliary neurotrophic factor, brain derived growth factor, neurotrophin 3, neurotrophin 4, bone morphogenetic protein 2 (BMP-2), glial-cell line derived neurotrophic factor, activity-dependent neurotrophic factor, cytokine leukaemia inhibiting factor, oncostatin M, an interleukin, α-interferon, β-interferon, γ-interferon, consensus interferon, TNF-α, clomethiazole; kynurenic acid, Semax, tacrolimus, L-threo-1-phenyl-2-decanoylamino-3-morpholino-1-propanol, adrenocorticotropin-(4-9) analogue (ORG 2766), dizolcipine [MK-801], selegiline, NPS1506, GV1505260, MK-801, GV150526, 2,3-dihydroxy-6-nitro-7-sulfamoylbenzo(f)quinoxaline (NBQX), LY303070, LY300164, and the anti-MAdCAM-1 antibody MECA-367.

Embodiment 88. The composition of any of Embodiments 76 to 87, said compound being cyclic G-2-AllylP.

Embodiment 89. The composition of any of Embodiments 76 to 87, wherein said compound is cyclic cyclohexyl-G-2MeP.

Embodiment 90. The composition of any of Embodiments 76 to 87, wherein said compound is cyclic cyclopentyl-G-2MeP.

Embodiment 91. The composition of Embodiment 76, further comprising one or more excipients, carriers, additives, adjuvants or binders in a tablet.

Embodiment 92. The composition of Embodiment 76, further comprising a microemulsion, coarse emulsion, or liquid crystal in a capsule.

Embodiment 93. The method of any of Embodiments 57 to 71, wherein said treatment produces an improvement in a symptom of PTHS as assessed using one or more clinical tests selected from the group consisting of the Aberrant Behavior Checklist Community Edition (ABC), Vineland Adaptive Behavior Scales, Clinical Global Impression of Severity (CGI-S), Clinical Global Impression Improvement (CGI-I), the Caregiver Strain Questionnaire (CSQ), or one or more physiological tests selected from the group consisting of electroencephalogram (EEG) spike frequency, overall power in frequency bands of an EEG, hemispheric coherence of EEG frequencies, stereotypic hand movement, QTc and heart rate variability (HRV), abnormal expression or activation of ERK1/2 and Akt, abnormal expression of growth-associated protein-43 (GAP-43), abnormal expression of synaptophysin (SYN), respiratory irregularities and coupling of cardiac and respiratory function compared to control animals not suffering from said disorder.

Embodiment 94. The method of any of embodiments 57 to 71 or 93, where said symptom of PTHS is cognitive impairment or cognitive dysfunction, one or more signs or symptoms of memory loss, loss of spatial orientation, decreased ability to learn, decreased ability to form short- or long-term memory, decreased episodic memory, decreased ability to consolidate memory, decreased spatial memory, decreased synaptogenesis, decreased synaptic stability, deficits in executive function, deficits in cognitive mapping and scene memory, deficits in declarative and relational memory, decreased rapid acquisition of configural or conjunctive associations, decreased context-specific encoding and retrieval of specific events, decreased episodic and/or episodic-like memory, anxiety, abnormal fear conditioning, abnormal social behaviour, repetitive behaviour, abnormal nocturnal behavior, seizure activity, abnormal locomotion, abnormal expression or activation of ERK1/2 and Akt, and bradycardia.

Embodiment 95. The method of any of embodiments 1 to 71 or 93-94, where the dose of the compound is from about 0.001 mg/kg to about 600 mg/kg.

Embodiment 96. The composition of any of embodiments 72 to 92, wherein the amount of compound is sufficient to produce an administered dose of compound in the range of about 0.001 mg/kg to about 600 mg/kg.

Embodiment 97. Any one or more of Embodiments 1 to 96, where said animal or mammal is a human being.

EXAMPLES

The present disclosure is further illustrated by the following examples. These examples are offered by way of illustration only and are not intended to limit the scope of the invention.

Example 1: General Methods of Synthesis of Compounds

Flash chromatography was performed using Scharlau 60 (40-60 μm mesh) silica gel. Analytical thin layer chromatography was carried out on 0.20 mm pre-coated silica gel plates (ALUGRAM® SIL G/UV$_{254}$) and compounds visualized using UV fluorescence, or heating of plates dipped in potassium permanganate in alkaline solution.

Melting points in degrees Celsius (° C.) were determined on an Electrothermal® melting point apparatus and are uncorrected.

Optical rotations were measured at 20° C. on a Perkin Elmer 341 polarimeter using 10 cm path length cells and are given in units of $10^{-1} deg cm^2 g^{-1}$. Samples were prepared in the solvent indicated at the concentration specified (measured in g/100 cm$^3$). IR spectra were recorded on a Perkin Elmer Spectrum One FT-IR spectrometer. The samples were prepared as thin films on sodium chloride discs or as solids in potassium bromide discs. A broad signal indicated by br. The frequencies (ν) as absorption maxima are given in wavenumbers (cm$^{-1}$).

NMR spectra were recorded on a Bruker AVANCE DRX400 ($^1$H, 400 MHz; $^{13}$C, 100 MHz) or a Bruker AVANCE 300 ($^1$H, 300 MHz; $^{13}$C, 75 MHz) spectrometer at ambient temperatures. For $^1$H NMR data chemical shifts are described in parts per million downfield from SiMe$_4$ and are reported consecutively as position ($\delta_H$), relative integral, multiplicity (s=singlet, d=doublet, t=triplet, dd=doublet of doublets, m=multiplet, br=broad), coupling constant (J/Hz) and assignment. For $^{13}$C NMR data, chemical shifts are described in parts per million relative to CDCl$_3$ and are reported consecutively as position ($\delta_C$), degree of hybridization as determined by DEPT experiments, and assignment. $^1$H NMR spectra were referenced internally using SiMe$_4$ (δ 0.00) or CDCl$_3$ (δ 7.26). $^{13}$C NMR spectra were referenced internally using CDCl$_3$ (δ 77.0). When two sets of peaks arise in the NMR spectra due to different conformations around the glycine-proline amide bond, the chemical shift for the minor cis conformer is marked with an asterisk (*).

Accurate mass measurements were recorded on a VG-70SE mass spectrometer.

Hexane and dichloromethane were distilled prior to use. Methanol was dried using magnesium turnings and iodine, and distilled under nitrogen. Triethylamine was dried over calcium hydride and distilled under nitrogen.

Example 2: Synthesis of (8aS)-Methyl-hexahydro-pyrrolo[1,2-a]pyrazine-1, -dione (Cyclic G-2MeP)

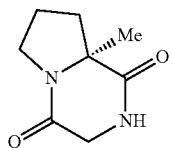

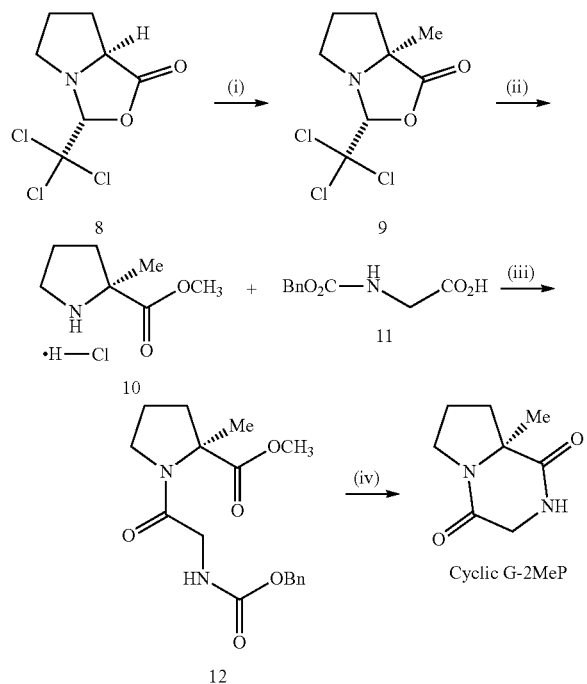

(i) LDA, THF, −78° C., iodomethane, −78 → −50° C., 2 h (63%); (ii) SOCl₂, CH₃OH, reflux, N₂, 2.5 h (98%); (iii) Et₃N, BoPCl, CH₂Cl₂, RT, N₂, 20.5 h (78%); (iv) 10% Pd/C, CH₃OH, RT, 15 h (98%).

(2R,5S)-4-Methyl-2-trichloromethyl-1-aza-3-oxabicyclo[3.3.0]octan-4-one 9 n-BuLi (1.31 M, 4.68 cm³, 6.14 mmol) was added dropwise to a stirred solution of diisopropylamine (0.86 cm³, 6.14 mmol) in dry tetrahydrofuran (10 cm³) at −78° C. under an atmosphere of nitrogen. The solution was stirred for 5 min, warmed to 0° C. and stirred for 15 min. The solution was then added dropwise to a solution of oxazolidinone 8 (1.00 g, 4.09 mmol) in dry tetrahydrofuran (20 cm³) at −78° C. over 20 min (turned to a dark brown colour), stirred for a further 30 min then iodomethane (0.76 cm³, 12.3 mmol) was added dropwise over 5 min. The solution was warmed to −50° C. over 2 h. Water (15 cm³) was added and the solution warmed to room temperature and extracted with chloroform (3×40 cm³). The combined organic extracts were dried (MgSO₄), filtered and evaporated to dryness in vacuo to give a dark brown semi-solid. Purification of the residue by flash column chromatography (15% ethyl acetate-hexane) afforded oxazolidinone 9 (0.67 g, 63%) as a pale yellow solid: mp 55-57° C. (lit., 57-60° C.); $\delta_H$ (300 MHz, CDCl₃) 1.53 (3H, s, CH₃), 1.72-2.02 (3H, m, Proβ-H and Proγ-H₂), 2.18-2.26 (1H, m, Proβ-H), 3.15-3.22 (1H, m, Proδ-H), 3.35-3.44 (1H, m, Proδ-H) and 4.99 (1H, s, NCH).

Methyl L-2-methylprolinate hydrochloride 10 a) Using Acetyl Chloride

Oxazolidinone 9 (0.60 g, 2.33 mmol) was dissolved in dry methanol (15 cm³) under an atmosphere of nitrogen and acetyl chloride (0.33 cm³, 4.66 mmol) was added dropwise to the ice-cooled solution. The solution was heated under reflux for 4.5 h, then the solvent removed under reduced pressure to give a brown oil which was purified by flash column chromatography (10% CH₃OH—CH₂Cl₂) affording the hydrochloride 10 (0.2 g, 48%) as a flaky white solid: mp 107-109° C. (lit., 106-108° C.); $\delta_H$ (300 MHz, CDCl₃) 1.81 (3H, s, CH₃), 1.93-2.14 (3H, m, Proβ-H$_A$H$_B$ and Proγ-H₂), 2.33-2.39 (1H, m, Proβ-H$_A$H$_B$), 3.52-3.56 (2H, m, Proδ-H₂) and 3.82 (3H, s, CO₂CH₃).

b) Using Thionyl Chloride

An ice-cooled solution of oxazolidinone 9 (53 mg, 0.21 mmol) in dry methanol (1 cm³) was treated dropwise with thionyl chloride (0.045 cm³, 0.62 mmol). The solution was heated under reflux for 2.5 h, cooled and the solvent removed under reduced pressure to yield a brown oil. The oil was dissolved in toluene (5 cm³), concentrated to dryness to remove residual thionyl chloride and methanol then purified by flash column chromatography (10% CH₃OH—CH₂Cl₂) to afford the hydrochloride 10 (16 mg, 43%) as a flaky white solid. The ¹H NMR assignments were in agreement with those reported above.

Methyl-N-benzyloxycarbonyl-glycyl-L-2-methylprolinate 12

Dry triethylamine (0.27 cm³, 1.96 mmol) was added dropwise to a solution of hydrochloride 10 (0.11 g, 0.61 mmol) and N-benzyloxycarbonyl-glycine 11 (98.5%) (0.17 g, 0.79 mmol) in dry dichloromethane (35 cm³) under an atmosphere of nitrogen at room temperature, and the reaction mixture stirred for 10 min. Bis(2-oxo-3-oxazolidinyl) phosphinic chloride (BoPCl, 97%) (0.196 g, 0.77 mmol) was added and the resultant colourless solution was stirred for 20.5 h. The solution was washed successively with 10% aqueous hydrochloric acid (30 cm³) and saturated aqueous sodium hydrogen carbonate (30 cm³), dried (MgSO₄), filtered and evaporated to dryness in vacuo. Purification of the resultant residue by flash column chromatography (50-80% ethyl acetate-hexane; gradient elution) yielded dipeptide 12 (0.18 g, 92%) as a colourless oil. Amide 12 was shown to exist as a 98:2 trans:cis mixture of conformers by ¹³C NMR analysis (the ratio was estimated from the relative intensities of the resonances at δ 20.8 and 23.5 assigned to the Proγ-C atoms of the minor and major conformers, respectively): $[\alpha]_D$-33.0 (c 1.0 in MeOH); $\nu_{max}$ (film)/cm⁻¹ 3406, 2952, 1732, 1651, 1521, 1434, 1373, 1329, 1310, 1284, 1257, 1220, 1195, 1172, 1135, 1107, 1082, 1052, 1029, 986, 965, 907, 876, 829, 775, 738 and 699; $\delta_H$ (300 MHz, CDCl₃) 1.49 (3H, s, CH₃), 1.77-2.11 (4H, m, Proβ-H₂ and Proγ-H₂), 3.43-3.48 (2H, m, Proδ-H₂), 3.61 (3H, s, OCH₃), 3.85-3.89 (2H, m, Glyα-H₂), 5.04 (2H, s, PhCH₂), 5.76 (1H, br s, N—H) and 7.21-7.28 (5H, s, ArH); $\delta_C$ (75 MHz, CDCl₃) 13.8* (CH₃, Proα-CH₃), 21.1 (CH₃, Proα-CH₃), 20.8*

(CH$_2$, Proγ-C), 23.5 (CH$_2$, Proγ-C), 38.0 (CH$_2$, Proβ-C), 40.8* (CH$_2$, Proβ-C), 43.3 (CH$_2$, Glyα-C), 45.5* (CH$_2$, Glyα-C), 46.6 (CH$_2$, Proδ-C), 48.7* (CH$_2$, Proδ-C), 51.9* (CH$_3$, OCH$_3$), 52.1 (CH$_3$, OCH$_3$), 60.0* (quat., Proα-C), 66.0 (quat., Proα-C), 66.3 (CH$_2$, PhCH$_2$), 68.6* (CH$_2$, PhCH$_2$), 127.5 (CH, Ph), 127.6 (CH, Ph), 127.9* (CH, Ph), 128.1 (CH, Ph), 128.3* (CH, Ph), 136.2 (quat., Ph), 155.9 (quat., NCO$_2$), 166.0 (quat., Gly-CON), 169.4* (quat., Gly-CON) and 173.6 (quat., CO$_2$CH$_3$); m/z (EI+) 334.1535 (M$^+$. C$_{17}$H$_{22}$N$_2$O$_5$ requires 334.1529).

(8aS)-Methyl-hexahydropyrrolo[1,2-a]pyrazine-1,4-dione (Cyclic G-2MeP)

To a solution of dipeptide 12 (0.167 g, 0.51 mmol) in methanol (8.0 cm$^3$) was added 10% Pd on activated charcoal (8.1 mg, 0.076 mmol) and the vessel flushed with hydrogen gas. The resulting suspension was stirred vigorously under an atmosphere of hydrogen for 15 h. The mixture was then filtered through a Celite pad then a short plug of silica gel with methanol, and the solvent removed under reduced pressure to produce cyclic G-2MeP (83 mg, 98%) as a yellow solid: mp 133-135° C.; [α]$_D$–128.1 (c 0.52 in MeOH); δ$_H$ (300 MHz, CDCl$_3$) 1.36 (3H, s, CH$_3$), 1.87-2.01 (3H, m, Proβ-H$_A$H$_B$ and Proγ-H$_2$), 2.07-2.21 (1H, m, Proβ-H$_A$H$_B$), 3.45-3.64 (2H, m, Proδ-H$_2$), 3.82 (1H, dd, J 17.1 and 4.1, CH$_A$H$_B$NH), 3.99 (1H, d, J 17.1, CH$_A$H$_B$NH) and 7.66 (1H, br s, N—H); δ$_C$ (75 MHz, CDCl$_3$) 20.2 (CH$_2$, Proγ-C), 23.2 (CH$_3$, Proα-CH$_3$), 35.0 (CH$_2$, Proβ-C), 44.7 (CH$_2$, Proδ-C), 45.9 (CH$_2$, CH$_2$NH), 63.8 (quat., Proα-C), 163.3 (quat., NCO) and 173.3 (quat., CONH); m/z (EI+) 168.08986 (M$^+$. C$_8$H$_{12}$N$_2$O$_2$ requires 168.08988).

Example 3: Synthesis of (8aS)-Methyl-spiro[cyclohexane-1,3(4H)-tetrahydropyrrolo[1,2-a]pyrazine]-1,4(2H)-dione (Cyclic cyclohexyl-G-2-MeP)

Scheme 2: Reagents, conditions and yields:

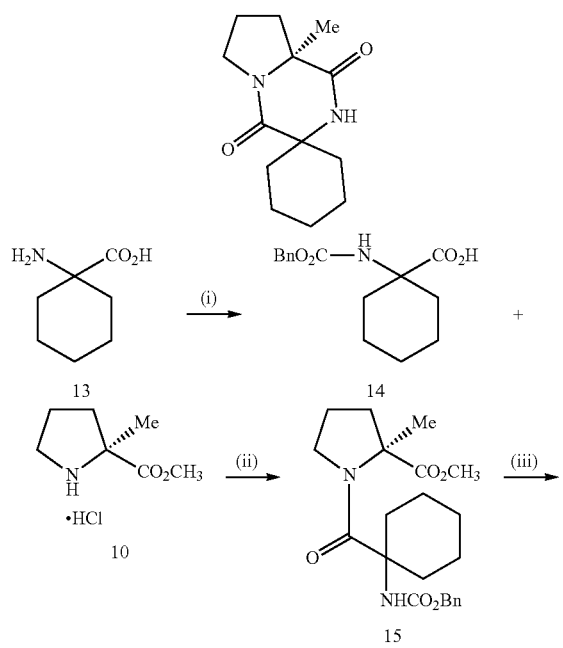

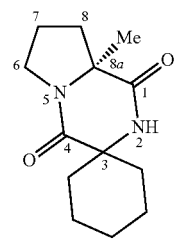

Cyclic cyclohexyl-G-2MeP (i) BnO$_2$CCl, Na$_2$CO$_3$, H$_2$O-dioxane (3:1), 19 h, 96%; (ii) Et$_3$N, HOAt, CIP, 1,2-dichloroethane, reflux, N$_2$, 19 h (23%); (iii) 10% Pd/C, CH$_3$OH, RT, 17 h (65%).

N-benzyloxycarbonyl-1-aminocyclohexane-1-carboxylic acid (14)

To a suspension of 1-aminocyclohexanecarboxylic acid 13 (0.72 g, 5.02 mmol) and sodium carbonate (1.6 g, 15.1 mmol) were dissolved in water-dioxane (21 cm$^3$, 3:1) was added benzyl chloroformate (0.79 cm$^3$, 5.52 mmol) was added dropwise and the solution was stirred at room temperature for 19.5 h. The aqueous layer was washed with diethyl ether (60 cm$^3$), acidified with 2 M HCl and extracted with ethyl acetate (2×60 cm$^3$). The organic layers were combined, dried (MgSO$_4$), filtered and evaporated under reduced pressure to produce a colourless oil, which solidified on standing to crude carbamate 14 (1.23 g, 88%) as a white solid: mp 152-154° C. (lit., 148-150° C.); δ$_H$ (400 MHz, CDCl$_3$) 1.27-1.56 (3H, m, 3× cyclohexyl-H), 1.59-1.73 (3H, m, 3× cyclohexyl-H), 1.85-1.91 (2H, m, 2× cyclopentyl-H), 2.05-2.09 (2H, m, 2× cyclopentyl-H), 5.02 (1H, br s, N—H), 5.12 (2H, s, OCH$_2$Ph) and 7.27-7.36 (5H, s, Ph); δ$_C$ (100 MHz, CDCl$_3$) 21.1 (CH$_2$, 2× cyclohexyl-C), 25.1 (CH$_2$, 2× cyclohexyl-C), 32.3 (CH$_2$, cyclohexyl-C), 59.0 (quat., 1-C), 67.1 (CH$_2$, OCH$_2$Ph), 128.1 (CH, Ph), 128.2 (CH, Ph), 128.5 (CH, Ph), 136.1 (quat., Ph), 155.7 (quat., NCO$_2$) and 178.7 (quat., CO$_2$H).

Methyl-N-benzyloxycarbonyl-cyclohexyl-glycyl-L-2-methylprolinate (15)

Dry triethylamine (0.21 cm$^3$, 1.5 mmol) was added dropwise to a solution of hydrochloride 10 (84.0 mg, 0.47 mmol), carboxylic acid 14 (0.17 g, 0.61 mmol) and 1-hydroxy-7-azabenzotriazole (16 mg, 0.12 mmol) in dry 1,2-dichloroethane (26 cm$^3$) under an atmosphere of nitrogen at room temperature, and the reaction mixture stirred for 10 min. 2-Chloro-1,3-dimethylimidazolidinium hexafluorophosphate (0.13 g, 0.47 mmol) was added and the resultant solution heated under reflux for 21 h, then washed successively with 10% aqueous hydrochloric acid (30 cm$^3$) and saturated aqueous sodium hydrogen carbonate (30 cm$^3$), dried (MgSO$_4$), filtered and evaporated to dryness in vacuo. Purification of the resultant residue by flash column chromatography (40-50% ethyl acetate-hexane; gradient elution) yielded amide 15 (16 mg, 9%) as a white solid. Amide 15 was shown to exist as a 11:1 trans:cis mixture of conformers by $^{13}$C NMR analysis (the ratio was estimated from the relative intensities of the resonances at δ 41.3 and 48.2 assigned to the Proδ-C atoms of the minor and major conformers, respectively): mp 219-222° C.; [α]$_D$–44.9 (c 1.31 in CH$_2$Cl$_2$); ν$_{max}$ (film)/cm$^{-1}$ 3239, 2927, 1736, 1707, 1617, 1530, 1450, 1403, 1371, 1281, 1241, 1208, 1194, 1165, 1150, 1132, 1089, 1071, 1028, 984, 912, 796, 749, 739 and 699; $\delta_H$ (400 MHz, CDCl$_3$) 1.24-2.10 (17H, m, Proα-CH$_3$, Proβ-H$_2$, Proγ-H$_2$ and 5× cyclohexyl-H$_2$), 3.25-3.48 (1H, br m, Proδ-H$_A$H$_B$), 3.61-3.87 (4H, br m, OCH$_3$ and Proδ-H$_A$H$_B$), 4.92-5.19 (3H, m, N—H and OCH$_2$Ph) and 7.35-7.37 (5H, s, Ph); &(100 MHz, CDCl$_3$) 21.26 (CH$_2$, cyclohexyl-C), 21.33 (CH$_2$, cyclohexyl-C), 21.7 (CH$_3$, Proα-CH$_3$), 24.8 (CH$_2$, cyclohexyl-C), 25.0 (CH$_2$, Proγ-C), 29.4* (CH$_2$, cyclohexyl-C), 29.7* (CH$_2$, cyclohexyl-C), 31.1 (CH$_2$, cyclohexyl-C), 31.6 (CH$_2$, cyclohexyl-C), 31.9* (CH$_2$, cyclohexyl-C), 32.2* (CH$_2$, cyclohexyl-C), 32.8* (CH$_2$, cyclohexyl-C), 37.3 (CH$_2$, Proβ-C), 41.4* (CH$_2$, Proδ-C), 48.2 (CH$_2$, Proδ-C), 52.1 (CH$_3$, OCH$_3$), 59.1 (quat., Glyα-C), 66.7 (CH$_2$, OCH$_2$Ph), 67.3* (CH$_2$, OCH$_2$Ph), 67.4 (quat., Proα-C), 128.0* (CH, Ph), 128.1* (CH, Ph), 128.3 (CH, Ph), 128.5 (CH, Ph), 128.7 (CH, Ph), 136.6 (quat., Ph), 153.7 (quat., NCO$_2$), 171.0 (quat., Gly-CO) and 174.8 (quat., CO$_2$CH$_3$); m/z (EI+) 402.2151 (M$^+$. C$_{22}$H$_{30}$N$_2$O$_5$ requires 402.2155).

(8aS)-Methyl-spiro[cyclohexane-1,3(4H)-tetrahydropyrrolo[1,2-a]pyrazine]-1,4(2H)-dione (Cyclic cyclohexyl-G-2MeP)

To a solution of amide 15 (40 mg, 0.01 mmol) in methanol (3.3 cm$^3$) was added 10% Pd on activated charcoal (1.6 mg, 0.015 mmol) and the vessel flushed with hydrogen gas. The resulting suspension was stirred vigorously under an atmosphere of hydrogen for 61.5 h, then filtered through a Celite™ pad with methanol (15 cm$^3$). The filtrate was concentrated to dryness under reduced pressure to produce a yellow semi-solid which was purified by reverse-phase C18 flash column chromatography (0-10% CH$_3$CN/H$_2$O; gradient elution) to produce cyclic cyclohexyl-G-2MeP (19 mg, 81%) as a white solid: mp 174-177° C.; [α]$_D$ −63.8 (c 1.13 in CH$_2$Cl$_2$); $v_{max}$ (film)/cm$^1$ 3215, 2925, 2854, 1667, 1646, 1463, 1427, 1276, 1232, 1171, 1085, 1014, 900, 868, 818, 783, 726 and 715; $\delta_H$ (400 MHz, CDCl$_3$) 1.31-1.89 (12H, m, 9× cyclohexyl-H and 8a-CH$_3$), 1.94-2.15 (4H, m, 7-H$_2$ and 8-H$_2$), 2.26 (1H, td, J 13.7 and 4.5, 1× cyclohexyl-H), 3.44-3.51 (1H, m, 6-H$_A$H$_B$), 3.79-3.86 (1H, m, 6-H$_A$H$_B$) and 6.40 (1H, br s, N—H); $\delta_C$ (100 MHz, CDCl$_3$) 19.5 (CH$_2$, 7-C), 20.6 (CH$_2$, cyclohexyl-C), 20.8 (CH$_2$, cyclohexyl-C), 24.5 (CH$_2$, cyclohexyl-C), 25.0 (CH$_3$, 8a-CH$_3$), 33.7 (CH$_2$, cyclohexyl-C), 36.3 (CH$_2$, 8-C), 36.5 (CH$_2$, cyclohexyl-C), 44.7 (CH$_2$, 6-C), 59.5 (quat., 8a-C), 64.0 (quat., 3-C), 168.1 (quat., 4-C) and 171.6 (quat., 1-C); m/z (EI+) 236.15246 (M$^+$. C$_{13}$H$_{20}$N$_2$O$_2$ requires 236.15248).

Example 4: Synthesis of (8aS)-Allyl-hexahydropyrrolo[1,2-a]pyrazine-1,4-dione (Cyclic G-2-AllylP)

Scheme 3: Reagents, conditions and yields:

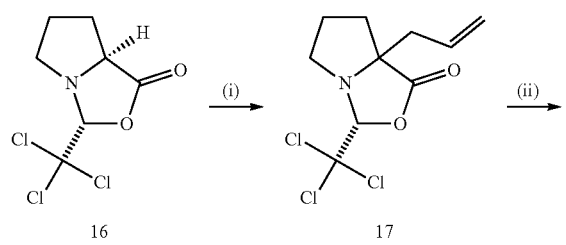

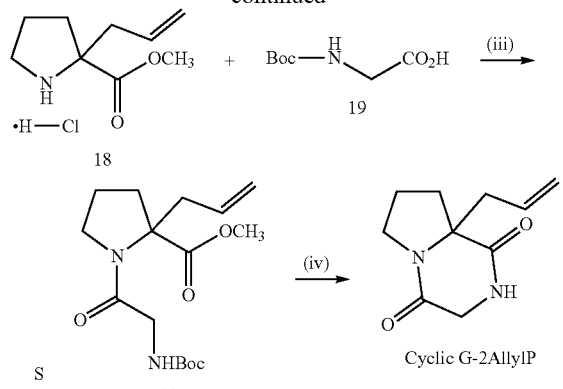

(i) LDA, THF, −78° C., allyl bromide, −78 −> −30° C., N$_2$, 4 h (60%); (ii) acetyl chloride, CH$_3$OH, reflux, N$_2$, 24 h (63%); (iii) Et$_3$N, BoPCl, CH$_2$Cl$_2$, RT, N$_2$, 19.5 h (45%); (iv) TFA, CH$_2$Cl$_2$, 1 h, then Et$_3$N, CH$_2$Cl$_2$, 23 h (37%).

(2R,5S)-4-Allyl-2-trichloromethyl-1-aza-3-oxabicyclo[3.3.0]octan-4-one 17 n-BuLi (1.31 M, 9.93 cm$^3$, 13.0 mmol) was added dropwise to a stirred solution of diisopropylamine (1.82 cm$^3$, 13.0 mmol) in dry tetrahydrofuran (20 cm$^3$) at −78° C. under an atmosphere of nitrogen. The solution was stirred for 5 min, warmed to 0° C., stirred for 15 min then added dropwise to a solution of pro-oxazolidinone 16 (2.12 g, 8.68 mmol) in dry tetrahydrofuran (40 cm$^3$) at −78° C. over 20 min and the reaction mixture was stirred for a further 30 min then allyl bromide (2.25 cm$^3$, 26.0 mmol) was added dropwise over 5 min. The solution was warmed slowly to −30° C. over 4 h, quenched with H$_2$O (30 cm$^3$) and the mixture warmed to room temperature and extracted with chloroform (3×80 cm$^3$). The combined organic extracts were dried (MgSO$_4$), filtered and evaporated to dryness in vacuo to produce a dark brown semi-solid which was purified by flash column chromatography (10-20% ethyl acetate-hexane; gradient elution) to produce oxazolidinone 17 (1.48 g, 60%) as an orange oil which solidified at 0° C., for which the nmr data were in agreement with that reported in the literature: $\delta_H$ (400 MHz, CDCl$_3$) 1.58-1.92 (2H, m, Proγ-H$_2$), 1.96-2.14 (2H, m, Proβ-H$_2$), 2.50-2.63 (2H, m, Pro-H$_2$), 3.12-3.23 (2H, m, CH$_2$—CH=CH$_2$), 4.97 (1H, s, NCH), 5.13-5.18 (2H, m, CH=CH$_2$) and 5.82-5.92 (1H, m, CH=CH$_2$); $\delta_C$ (100 MHz, CDCl$_3$) 25.1 (CH$_2$, Proγ-C), 35.1 (CH$_2$, Proβ-C), 41.5 (CH$_2$, Proδ-C), 58.3 (CH$_2$, CH$_2$CH=CH$_2$), 71.2 (quat., Proα-C), 100.4 (quat., CCl$_3$), 102.3 (CH, NCH), 119.8 (CH$_2$, CH$_2$CH=CH$_2$), 131.9 (CH, CH$_2$CH=CH$_2$) and 176.1 (quat., C=O); m/z (CI+) 284.0009 [(M+H)$^+$. C$_{10}$H$_{13}$$^{35}$Cl$_3$NO$_2$ requires 284.0012], 285.9980 [(M+H)$^+$. C$_{10}$H$_{13}$$^{35}$Cl$_2$$^{37}$ClNO$_2$ requires 285.9982], 287.9951 [(M+H)$^+$. C$_{10}$H$_{13}$$^{35}$Cl$_2$$^{37}$Cl$_2$NO$_2$ requires 287.9953] and 289.9932 [(M+H)$^+$. C$_{10}$H$_{13}$$^{37}$Cl$_3$NO$_2$ requires 289.9923].

Methyl L-2-allylprolinate hydrochloride 18

An ice-cooled solution of oxazolidinone 17 (0.64 g, 2.24 mmol) in dry methanol (15 cm$^3$) was treated dropwise with a solution of acetyl chloride (0.36 cm$^3$, 5.0 mmol) in methanol (5 cm$^3$). The solution was heated under reflux for 24 h, then cooled and the solvent removed under reduced pressure. The resultant brown oil was dissolved in toluene (40 cm$^3$) and concentrated to dryness to remove residual thionyl chloride and methanol, then purified by flash column chromatography (5-10% CH$_3$OH—CH$_2$Cl$_2$; gradient elution) to afford hydrochloride 18 (0.29 g, 63%) as a green solid for which the NMR data were in agreement with that reported in the literature: $\delta_H$ (300 MHz, CDCl$_3$) 1.72-2.25 (3H, m, Proβ-H$_A$H$_B$ and Proγ-H$_2$), 2.32-2.52 (1H, m, Proβ-H$_A$H$_B$), 2.72-3.10 (2H, m, Proδ-H$_2$), 3.31-3.78 (2H, m, CH$_2$CH=CH$_2$), 3.84 (3H, s, CO$_2$CH$_3$), 5.20-5.33 (2H, m, CH=CH$_2$), 5.75-5.98 (1H, m, CH=CH$_2$) and 8.06 (1H, br s, N—H); m/z (CI+) 170.1183 [(M+H)$^+$. C$_9$H$_{16}$NO$_2$ requires 170.1181].

Methyl-N-tert-butyloxycarbonyl-glycyl-L-2-allyl-prolinate 20

Dry triethylamine (0.28 cm$^3$, 2.02 mmol) was added dropwise to a solution of hydrochloride 18 (0.13 g, 0.63 mmol) and N-tert-butyloxycarbonyl-glycine 19 (0.14 g, 0.82 mmol) in dry dichloromethane (35 cm$^3$) under an atmosphere of nitrogen at room temperature, and the reaction mixture was stirred for 10 min. Bis(2-oxo-3-oxazolidinyl) phosphinic chloride (BoPCl, 97%) (0.20 g, 0.80 mmol) was added and the solution stirred for 19.5 h, then washed successively with 10% aqueous hydrochloric acid (35 cm$^3$) and saturated aqueous sodium hydrogen carbonate (35 cm$^3$), dried (MgSO$_4$), filtered and evaporated to dryness in vacuo. Purification of the resultant residue by flash column chromatography (40% ethyl acetate-hexane) yielded dipeptide 20 (0.09 g, 45%) as a light yellow oil: [α]$_D$+33.8 (c 0.83 in CH$_2$Cl$_2$); $\nu_{max}$ (film)/cm$^{-1}$ 3419, 3075, 2977, 2930, 2874, 1739, 1715, 1656, 1499, 1434, 1392, 1366, 1332, 1268, 1248, 1212, 1168, 1122, 1051, 1026, 1003, 943, 919, 867, 830, 779, 739, 699 and 679; $\delta_H$ (300 MHz, CDCl$_3$) 1.42 [9H, s, C(CH$_3$)$_3$], 1.93-2.08 (4H, m, Proβ-H$_2$ and Proγ-H$_2$), 2.59-2.67 (1H, m, CH$_A$H$_B$CH=CH$_2$), 3.09-3.16 (1H, m, CH$_A$H$_B$CH=CH$_2$), 3.35-3.44 (1H, m, Proδ-H$_A$H$_B$), 3.56-3.62 (1H, m, Proδ-H$_A$H$_B$), 3.70 (3H, s, OCH$_3$), 3.89 (2H, d, J 4.2, Glyα-H$_2$), 5.06-5.11 (2H, m, CH=CH$_2$), 5.42 (1H, br s, Gly-NH) and 5.58-5.72 (1H, m, CH=CH$_2$); δC (75 MHz, CDCl$_3$) 23.7 (CH$_2$, Proγ-C), 28.3 [CH$_3$, C(CH$_3$)$_3$], 35.0 (CH$_2$, Proβ-C), 37.6 (CH$_2$, CH$_2$CH=CH$_2$), 43.3 (CH$_2$, Glyα-C), 47.5 (CH$_2$, Proδ-C), 52.5 (CH$_3$, OCH$_3$), 68.8 (quat., Proα-C), 79.5 [quat., C(CH$_3$)$_3$], 119.4 (CH$_2$, CH=CH$_2$), 132.9 (CH, CH=CH$_2$), 155.7 (quat., NCO$_2$), 166.9 (quat., Gly-CON) and 173.8 (quat., CO$_2$CH$_3$); m/z (EI+) 326.1845 (M+. C$_{16}$H$_{26}$N$_2$O$_5$ requires 326.1842).

(8aS)-Allyl-hexahydropyrrolo[1,2-a]pyrazine-1,4-dione (Cyclic G-2AllylP)

To a solution of dipeptide 20 (0.09 g, 0.28 mmol) in dichloromethane (9 cm$^3$) at room temperature was added trifluoroacetic acid (1 cm$^3$, 0.013 mmol) dropwise and the reaction mixture was stirred for 1 h under an atmosphere of nitrogen. The solution was evaporated under reduced pressure to give a colorless oil which was dissolved in dichloromethane (10 cm$^3$), dry triethylamine (0.096 cm$^3$, 0.69 mmol) was added and the reaction mixture stirred for 4.5 h, after which further triethylamine (0.096 cm$^3$, 0.69 mmol) was added. The reaction mixture was stirred overnight, concentrated to dryness to give a green oil which was purified by flash column chromatography (10% CH$_3$OH—CH$_2$Cl$_2$) to produce cyclic G-2AllylP (20 mg, 37%) as an off-white solid: mp 106-109° C.; [α]$_D$-102.7 (c 0.95 in CH$_2$Cl$_2$); $\nu_{max}$ (CH$_2$Cl$_2$)/cm$^{-1}$ 3456, 3226, 2920, 1666, 1454, 1325, 1306, 1299, 1210, 1133, 1109, 1028, 1010, 949, 928, 882, 793, 761 and 733; $\delta_H$ (400 MHz, CDCl$_3$) 1.92-2.01 (2H, m, Proγ-H$_2$), 2.09-2.16 (2H, m, Proβ-H$_2$), 2.39-2.56 (2H, m, CH$_2$CH=CH$_2$), 3.46-3.53 (1H, m, Proδ-H$_A$H$_B$), 3.78-3.87 (2H, m, Proδ-H$_A$H$_B$ and Glyα-H$_A$H$_B$), 4.09 (1H, d, J 17.2, Glyα-H$_A$H$_B$), 5.16-5.20 (2H, m, CH=CH$_2$), 5.73-5.84 (1H, m, CH=CH$_2$) and 7.17 (1H, br s, N—H); $\delta_C$ (100 MHz, CDCl$_3$) 20.1 (CH$_2$, Proγ-C), 34.1 (CH$_2$, Proβ-C), 41.7 (CH$_2$, CH$_2$CH=CH$_2$), 44.9 (CH$_2$, Pro-C), 46.4 (CH$_2$, Glyα-C), 67.2 (quat., Proα-C), 120.9 (CH$_2$, CH=CH$_2$), 131.0 (CH, CH=CH$_2$), 163.4 (quat., NCO) and 171.7 (quat., CONH); m/z (EI+) 195.1132 (M$^+$. C$_{10}$H$_{15}$N$_2$O$_2$ requires 195.1134).

Example 5: Synthesis of (8aS)-Methyl-spiro[cyclopentane-1,3(4H)-tetrahydropyrrolo[1,2-a]pyrazine]-1,4(2H)-dione (Cyclic Cyclopentyl-G-2-MeP)

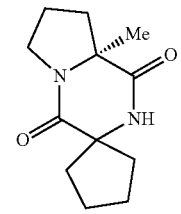

Scheme 4: Reagents, conditions and yields:

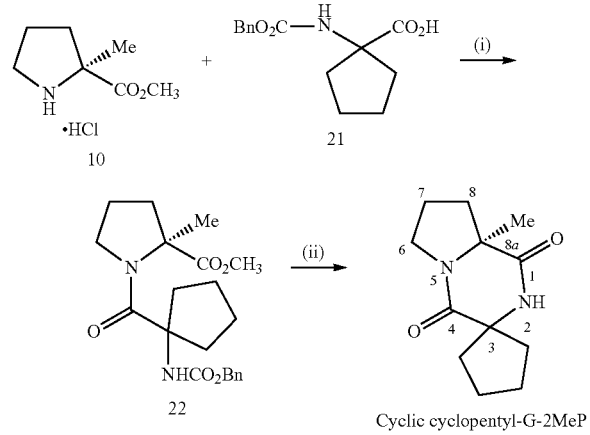

(i) Et$_3$N, HOAt, CIP, 1,2-dichloroethane, 83 ° C., N$_2$, 19 h (23%); (ii) 10% Pd/C, CH$_3$OH, RT, 17 h (65%).

N-Benzyloxycarbonyl-1-aminocyclopentane-1-carboxylic acid 21

A solution of benzyl chloroformate (0.290 g, 1.1 mmol) in dioxane (2.5 cm$^3$) was added dropwise to a solution of 1-aminocyclopentanecarboxylic acid (Fluka) (0.2 g, 1.54 mmol) and sodium carbonate (0.490 g, 4.64 mmol) in water (5 cm$^3$) at 0° C. Stirring was continued at room temperature overnight and the reaction mixture washed with ether. The aqueous layer was acidified with 2M hydrochloric acid, extracted with ethyl acetate, dried (Na$_2$SO$_4$), filtered and the solvent removed to afford carbamate 21 (0.253 g, 62%) as an oil which solidified on standing. Carbamate 21 was shown to be a 70:30 mixture of conformers by $^1$H NMR analysis (the ratio was estimated from the integration of the resonances at δ 5.31 and 7.29-7.40, assigned to the N—H protons of the major and minor conformers, respectively): mp 70-80° C. (lit.[1] 82-86° C., ethyl acetate, petroleum ether); $\delta_H$ (400 MHz; CDCl$_3$; Me$_4$Si) 1.83 (4H, br s, 2× cyclopentyl-H$_2$), 2.04 (2H, br s, cyclopentyl-H$_2$), 2.20-2.40 (2H, m, cyclopentyl-H$_2$), 5.13 (2H, br s, OCH$_2$Ph), 5.31 (0.7H, br s, N—H) and 7.29-7.40 (5.3H, m, Ph and N—H*); $\delta_C$ (100 MHz; CDCl$_3$) 24.6 (CH$_2$, cyclopentyl-C), 37.5 (CH$_2$, cyclopentyl-C), 66.0 (quat., cyclopentyl-C), 66.8 (CH$_2$, OCH$_2$Ph), 128.0 (CH, Ph), 128.1 (CH, Ph), 128.4 (CH, Ph), 136.1 (quat, Ph), 155.8 (quat., NCO$_2$) and 179.5 (quat., CO$_2$H).

* denotes resonance assigned to minor conformer.

Methyl N-benzyloxycarbonyl cyclopentyl-glycyl-L-2-methylprolinate 22

Dry triethylamine (0.19 cm$^3$, 1.4 mmol) was added dropwise to a solution of hydrochloride 10 (78 mg, 0.43 mmol), carboxylic acid 21 (0.15 g, 0.56 mmol) and 1-hydroxy-7-azabenzotriazole (Acros) (15 mg, 0.11 mmol) in dry 1,2-dichloroethane (24 cm$^3$) under an atmosphere of nitrogen at room temperature, and the reaction mixture stirred for 10 min. 2-Chloro-1,3-dimethylimidazolidinium hexafluorophosphate (CIP) (Aldrich) (0.12 g, 0.43 mmol) was added and the resultant solution heated under reflux for 19 h, then washed successively with 10% aqueous hydrochloric acid (30 cm$^3$) and saturated aqueous sodium hydrogen carbonate (30 cm$^3$), dried (MgSO$_4$), filtered and evaporated to dryness in vacuo. Purification of the resultant residue by flash column chromatography (60% ethyl acetate-hexane) yielded amide 22 (39 mg, 23%) as a white solid. Amide 22 was shown to exist as a 3:1 trans:cis mixture of carbamate conformers by $^{13}$C NMR analysis (the ratio was estimated from the relative intensities of the resonances at δ 154.1 and 155.7 assigned to the carbamate carbonyl-C atoms of the major and minor conformers, respectively): mp 200-203° C.; $[\alpha]_D$ –54.5 (c 1.52 in CH$_2$Cl$_2$); $\nu_{max}$ (film)/cm$^{-1}$ 3432, 3239, 3042, 2953, 1736, 1712, 1627, 1540, 1455, 1417, 1439, 1374, 1282, 1256, 1216, 1194, 1171, 1156, 1136, 1100, 1081, 1042, 1020, 107, 953, 917, 876, 756 and 701; $\delta_H$ (400 MHz, CDCl$_3$) 1.33-1.53 (3H, br m, Proα-CH$_3$), 1.62-2.20 (11H, m, Proβ-H$_2$, Proγ-H$_2$ and 7× cyclopentyl-H), 2.59-2.71 (1H, br m, 1× cyclopentyl-H), 3.31-3.42 (1H, br m, Proδ-H$_A$H$_B$), 3.58-3.79 (4H, br m, OCH$_3$ and Proδ-H$_A$H$_B$), 4.92-5.17 (3H, m, N—H and OCH$_2$Ph) and 7.27-7.42 (5H, s, Ph); $\delta_C$ (100 MHz, CDCl$_3$) 21.7 (CH$_3$, Proα-CH$_3$), 24.1* (CH$_2$, cyclopentyl-C), 24.2 (CH$_2$, cyclopentyl-C), 24.4 (CH$_2$, Proγ-C), 24.5 (CH$_2$, cyclopentyl-C), 36.4 (CH$_2$, cyclopentyl-C), 37.1 (CH$_2$, cyclopentyl-C), 37.2* (CH$_2$, cyclopentyl-C), 37.7 (CH$_2$, Proβ-C), 38.2* (CH$_2$, cyclopentyl-C), 48.5 (CH$_2$, Pro-C), 52.1 (CH$_3$, OCH$_3$), 66.6 (CH$_2$, OCH$_2$Ph), 66.9 (quat., Proα-C), 67.2 (quat., Glyα-C), 127.8 (CH, Ph), 128.2 (CH, Ph), 128.4 (CH, Ph), 136.6 (quat., Ph), 154.1 (quat., NCO$_2$), 155.7* (quat., NCO$_2$), 170.5 (quat., Gly-CO) and 174.7 (quat., CO$_2$CH$_3$); m/z (EI+) 388.1991 (M+. C$_{21}$H$_{28}$N$_2$O$_5$ requires 388.1998).

(8aS)-Methyl-spiro[cyclopentane-1,3(4H)-tetrahydropyrrolo[1,2-a]pyrazine]-1,4(2H)-dione (Cyclic cyclopentyl-G-2MeP)

To a solution of amide 22 (54 mg, 0.14 mmol) in methanol (4.6 cm$^3$) was added 10% Pd on activated charcoal (2.2 mg, 0.021 mmol) and the vessel flushed with hydrogen gas. The resulting suspension was stirred vigorously under an atmosphere of hydrogen for 17 h, then filtered through a Celite™ pad with methanol (15 cm$^3$). The filtrate was concentrated to dryness under reduced pressure to give a yellow semi-solid which was purified by reverse-phase C18 flash column chromatography (0-10% CH$_3$CN/H$_2$O; gradient elution) to afford cyclic cyclopentyl-G-2MeP (20 mg, 65%) as a yellow solid: mp 160-163° C.; $[\alpha]_D$ –97.9 (c 1.61 in CH$_2$Cl$_2$); $\nu_{max}$ (film)/cm$^{-1}$ 3429, 2956, 2928, 2856, 1667, 1643, 1463, 1432, 1373, 1339, 1254, 1224, 1175, 1086, 1048, 976, 835, 774 and 730; $\delta_H$ (300 MHz, CDCl$_3$) 1.47 (3H, br s, 8a-CH$_3$), 1.56-2.19 (11H, m, 8-H$_2$, 7-H$_2$ and 7× cyclopentyl), 2.58-2.67 (1H, br m, 1× cyclopentyl), 3.48-3.56 (1H, m, 6-H$_A$H$_B$), 3.72-3.82 (1H, m, 6-H$_A$H$_B$) and 6.56 (1H, br s, N—H); $\delta_C$ (75 MHz, CDCl$_3$) 19.9 (CH$_2$, 7-C), 24.6 (CH$_2$, cyclopentyl), 24.92 (CH$_3$, 8a-CH$_3$), 24.93 (CH$_2$, cyclopentyl), 36.0 (CH$_2$, 8-C), 38.7 (CH$_2$, cyclopentyl), 41.9 (CH$_2$, cyclopentyl), 44.8 (CH$_2$, 6-C), 64.3 (quat., 8a-C), 66.8 (quat., 3-C), 168.3 (quat., 4-C) and 172.2 (quat., 1-C); m/z (EI+) 222.1369 (M+. C$_{12}$H$_{18}$N$_2$O$_2$ requires 222.1368).

In Vitro and In Vivo Testing

The following pharmacological studies demonstrate efficacy of cyclic G-2-AllylP in attenuation of symptoms of PTHS. They are not intended to be limiting, and other compositions and methods of this invention can be developed without undue experimentation. All of those compositions and methods are considered to be part of this disclosure. All the following experiments were carried out using protocols developed under guidelines approved by the University of Chile Animal Ethics Committee or comparable regulatory bodies.

Example 6: Delivery of cG2-AllylP into the Brain after Oral Administration

In an in vivo study, male Sprague Dawley rats (aged 14 weeks) received a single dose of cG-2-AllylP, either 100 mg/kg or 200 mg/kg by oral gavage. Cerebrospinal fluid (CSF) and whole blood were collected at 1.5 and 4 hours postdose, and brain tissue was collected at 4 hours postdose to evaluate cG-2-AllylP exposure. Table 1 below shows the blood, CSF, and brain cG-2-AllylP in CSF and blood 1.5 hours after dosing.

| Concentration of cG-2-AllylP in CSF, Blood and the Brain in Wild Type Rats | | | |
|---|---|---|---|
| | Mean Test Article Exposure Dose | | |
| | 100 mg/kg | 200 mg/kg | 200:100 mg/kg |
| 1.5 h postdose | | | |
| CSF | 40.4 µg/ml | 82.2 µg/ml | 2.03:1 |
| Blood | 58.5 µg/ml | 116.0 µg/ml | 1.98:1 |
| 4 h postdose | | | |
| CSF | 11.0 µg/ml | 24.7 µg/ml | 2.25:1 |
| Blood | 15.6 µg/ml | 34.2 µg/ml | 2.19:1 |
| Brain | 22.6 µg/ml | 37.0 µg/ml | 1.63:1 |

CSF = cerebrospinal fluid.

There was an approximately proportional increase in the concentration of cG-2-AllylP in blood and CSF at 1.5 hours and in blood, CSF and brain at 4 hours following a single, oral dose. At 4 hours post dose, the concentration of cG-2-AllylP in blood and brain tissue was approximately equivalent.

Example 7: Effects of cG-2-AllylP in Tcf4$^{+/-}$ Mouse Model of Pitt Hopkins Syndrome

A. Relevance of Mouse Model

Several genetically manipulated rodent models of PTHS have been created (Thaxton et al, 2018; Sweatt, 2013). These models share a common basis around heterozygous Tcf4 (Tcf4$^{+/-}$). Haploinsufficient mice (Tcf4$^{+/-}$) have been characterized as a model system for PTHS (Kennedy et al, 2016). Kennedy et al's (2016) work showed that Tcf4$^{+/-}$ mice demonstrate behavior consistent with the cognitive and motor dysregulation associated with PTHS, including aversion to social interaction, learning deficits, and impairments in gross motor control.

B. Experimental Design

In vivo behavioral studies were conducted in Tcf4$^{+/-}$ mutant and wildtype littermate control (WT) mice by Gen.DDI (Santiago, Chile). Littermate controls consist of the genotypes Tcf4$^{+/+}$. All Tcf4 mutant mice used were heterozygous for the Tcf4 mutation because homozygous mutations of Tcf4 result in embryonic to postnatal day 1 lethality. Ten mice per treatment group, 14 weeks of age, were used for behavioral experiments. Experiments were conducted in line with the requirements of the UK Animals (Scientific Procedures) Act, 1986. The mice were housed in plastic cages (35×30×12 cm), 5 in each and habituated to the animal facilities for at least a week before commencing the test. The room temperature (21° C.±2° C.), relative humidity (55%±5%), a 12-hour light-dark cycle (lights on 7 AM to 7 PM), and air exchange were automatically controlled. The animals had free access to commercial food pellets and water. Testing was performed during the light phase of the circadian cycle, with the order of testing being determined by the principle of conducting the most stressful tests last. Assays were designed to reproduce and expand on the original behavioral characterization of Tcf4$^{+/-}$ mice. Tcf4$^{+/-}$ and WT control mice were treated for 6 weeks prior to testing and tested 30 minutes following a dose of cG-2-AllylP, as described in Table 2 below.

| Dosing Regimens | | | | | |
| --- | --- | --- | --- | --- | --- |
| Group No. | Testing Groups | Oral | Concentration | Treatment | N |
| 1 | WT + Vehicle | o.p. | | BID, 30 min prior to test | 10 |
| 2 | KO + Vehicle | o.p. | | BID, 30 min prior to test | 10 |
| 3 | WT + cG-2-AllylP | o.p. | 100 mg/kg | BID, 30 min prior to test | 10 |
| 4 | KO + cG-2-AllylP | o.p. | 100 mg/kg | BID, 30 min prior to test | 10 |
| 5 | WT + cG-2-AllylP | o.p. | 200 mg/kg | BID, 30 min prior to test | 10 |
| 6 | KO + cG-2-AllylP | o.p. | 200 mg/kg | BID, 30 min prior to test | 10 |

BID = twice a day dosing;
KO = Knock Out;
o.p. = per os;
WT = wildtype littermate control.

Example 8: Open Field Hypoactivity

The Open Field (OF) test is a combined test that is used to determine anxiety/hyperactivity, and for habituation to a novel environment, one of the most elementary forms of learning, in which decreased exploration as a function of repeated exposure to the same environment is taken as an index of memory. This is normally studied in two sessions of exposure to the open field, a 10-min and a 24 hr habituation session.

The device used for this study is a grey PVC enclosed arena 50×30 cm divided into 10 cm squares. Mice are brought to the experimental room 5-20 min before testing. A mouse is placed into a corner square facing the corner and observed for 3 min. The number of squares entered (whole body) and rears (both front paws off the ground, but not as part of grooming) are counted. The latency to the first rear is also noted. The movement of the mouse around the field was recorded with a video tracking device for 300 s (vNT4.0, Viewpoint). The latency for the mouse to enter the brightest, central part of the field total time spent in this central region, and total activity (in terms of path length in centimetres), were recorded.

The open field (OF) test is a test used to characterize explorative behavior, anxiety, and/or hypo- and hyperactivity in animals habituated to daily handling under novel and familiar conditions. During exposure to the open field mice will habituate to the environment and thus explore less, decreasing the amount movement they show over time.

In the present experiment, we recorded movement and rearing during an initial exposure (T1), during a second exposure after 10 minutes (T2) and during a third exposure after 24 hours (T3). Failures to reduce locomotion or rearing at 10 minutes and 24 hours indicate deficits in short- and long-term memory, respectively.

To evaluate whether cG-2-AllylP is effective to treat the hypoactivity in PTHS, we carried out Open Field studies. Lower scores on measures of open field locomotion were detected in Tcf4$^{+/-}$ as compared to WT littermates, across the 30-minute test session.

Figure 2:
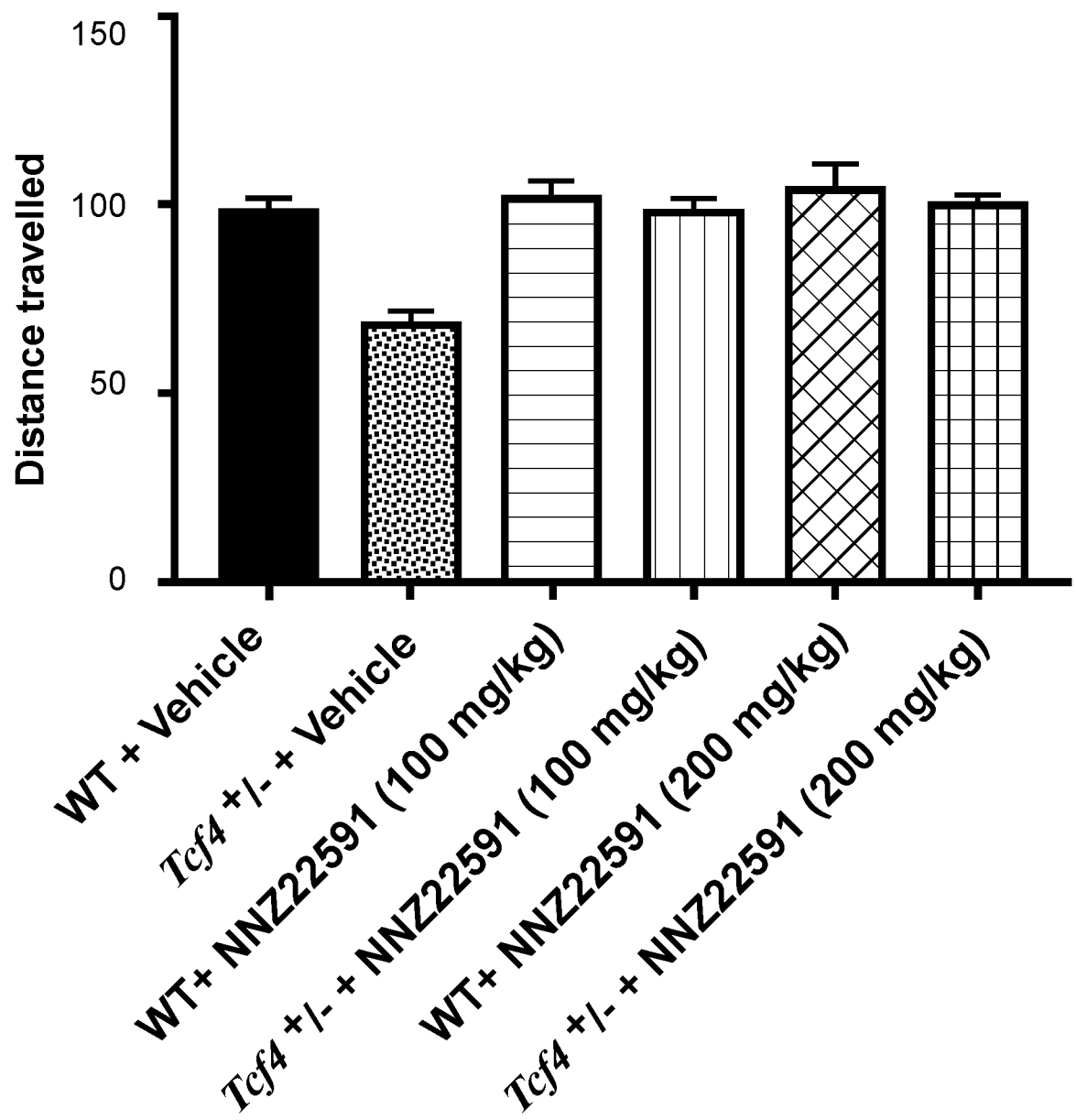
FIG. 2 is a graph showing the results of an open field study of the effects of cG-2-AllylP or vehicle in mice having the tcf4$^{+/-}$ mutation on hypoactivity (distance travelled) compared to wild type mice.

The results are shown in FIG. 2.

The relative distance travelled is shown on the vertical axis, and the animals and their treatments are shown on the horizontal axis. Wild type (WT) mice treated with vehicle alone (left column) were considered to travel 100%. Tcf4$^{+/-}$ mice treated with vehicle alone (second column from left) exhibited only about 60% of the mobility compared to WT mice, and therefore were found to be hypoactive. WT mice treated with NNZ-2591 (cG-2-AllylP) (third from left column) exhibited slightly higher mobility than WT mice treated with vehicle, but this difference was small and not statistically significant. In contrast to the Tcf4$^{+/-}$ mice treated with vehicle alone, we surprisingly found that Tcf4$^{+/-}$ mice treated with 100 mg/kg NNZ-2591 (cG-2-AllylP); fourth column from left, showed nearly identical mobility as did WT mice treated with vehicle alone. WT mice treated with 200 mg/kg of NNZ-2591 (cG-2AllylP); fifth column from left) exhibited nearly the same mobility as did WT mice treated either with vehicle alone or with 100 mg/kg of NNZ-2591 (cG-2-AllylP). The effect of NNZ-2591 (cG-2-AllylP) were statistically significant. We conclude that NNZ-2591 (cG-2-AllylP) at either 100 mg/kg or 200 mg/kg normalized this mild to moderate hypoactivity in Tcf4$^{+/-}$ mice.

Open Field (Hypoactivity)

| ANOVA Summary | |
|---|---|
| F | 166.2 |
| P value | <.00001 |
| P value summary | **** |
| Significant difference among means (P < 0.05)? | Yes |
| R square | 0.939 |

| Tukey's Multiple Comparison Test | Summary | P Value |
|---|---|---|
| WT + vehicle vs Tcf4$^{+/-}$ + vehicle | **** | <0.00001 |
| WT + vehicle vs WT + cG-2-AllylP (100 mg/kg) | ns | 0.1546 |
| WT + vehicle vs Tcf4$^{+/-}$ + cG-2-AllylP (100 mg/kg) | ns | >0.9999 |
| WT + vehicle vs WT + cG-2-AllylP (200 mg/kg) | ns | 0.3821 |
| WT + vehicle vs Tcf4$^{+/-}$ + cG-2-AllylP (200 mg/kg) | ns | 0.9782 |
| Tcf4$^{+/-}$ + vehicle vs WT + cG-2-AllylP (100 mg/kg) | **** | <0.0001 |
| Tcf4$^{+/-}$ + vehicle vs Tcf4$^{+/-}$ + cG-2-AllylP 1 (200 mg/kg) | **** | <0.0001 |
| Tcf4$^{+/-}$ + vehicle vs Tcf4$^{+/-}$ + cG-2-AllylP (100 mg/kg) | **** | <0.0001 |
| Tcf4$^{+/-}$ + vehicle vs Tcf4$^{+/-}$ + cG-2-AllylP (200 mg/kg) | **** | <0.0001 |
| WT + cG-2-AllylP (100 mg/kg) vs Tcf4$^{+/-}$ + cG-2-AllylP (100 mg/kg) | ns | 0.1137 |
| WT + cG-2-AllylP (100 mg/kg) vs WT + cG-2-AllylP (200 mg/kg) | ns | 0.9957 |
| WT + cG-2-AllylP (100 mg/kg) vs Tcf4$^{+/-}$ + cG-2-AllylP (200 mg/kg) | ns | 0.5145 |
| Tcf4$^{+/-}$ + cG-2-AllylP (100 mg/kg) vs WT + cG-2-AllylP (200 mg/kg) | ns | 0.3037 |
| Tcf4$^{+/-}$ + cG-2-AllylP (100 mg/kg) vs Tcf4$^{+/-}$ + cG-2-AllylP (200 mg/kg) | ns | 0.9524 |
| WT + cG-2-AllylP (200 mg/kg) vs Tcf4$^{+/-}$ + cG-2-AllylP (200 mg/kg) | ns | 0.8203 |

ANOVA = analysis of variance;
ns = not significant;
WT = wildtype littermate control;
**** = p < 0.00001

Example 9: Self Grooming

Figure 3:
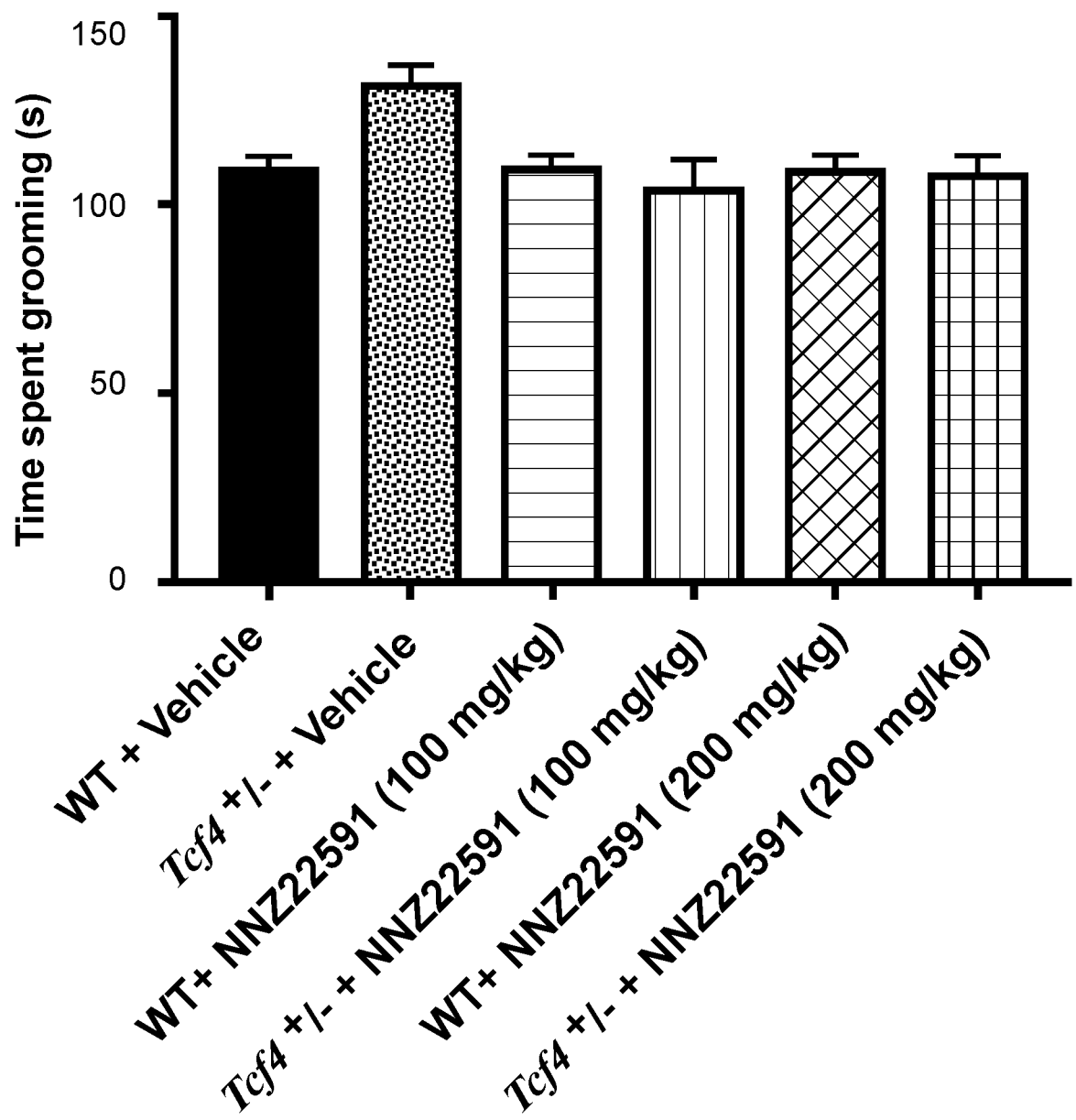
FIG. 3 is a graph showing results from studies of the effects of cG-2-AllylP or vehicle in mice having the tcf4$^{+/-}$ mutation on repetitive behavior (the time spent self grooming) compared to wild type mice.

Repetitive self-grooming is a feature of mice. Tcf4$^{+/-}$ mice show an increased amount of self-grooming compared to wild type mice. To see if NNZ-2591 (cG-2-AllylP) can normalize self-grooming behavior in Tcf4$^{+/-}$ mice, we carried out a series of studies, as shown in FIG. 3.

The amount of time spent grooming in seconds during a 10-minute test period is shown on the vertical axis, and the animals and treatments are shown on the horizontal axis. Wild type (WT) mice treated with vehicle alone (left column) self-groomed for about 110 sec. Tcf4$^{+/-}$ mice treated with vehicle alone (second column from left) had an increase in self-grooming compared to WT mice treated with vehicle alone. WT mice treated with 100 mg/kg NNZ-2591 (cG-2-AllylP; third column from left) self-groomed for about the same amount of time as did WT mice treated with vehicle alone. This difference was not statistically significant. We unexpectedly found that Tcf4$^{+/-}$ mice treated with 100 mg/kg NNZ-2591 (cG-2-AllylP; fourth column from left) or 200 mg/kg (right column) spent about the same amount of time self-grooming as WT vehicle treated mice and less than the time spent self-grooming in Tcf4$^{+/-}$ mice treated with vehicle alone. This statistically significant finding was completely unexpected in Tcf4$^{+/-}$ mice.

Self-Grooming/Repetitive Behavior

| ANOVA Summary | |
|---|---|
| F | 53.01 |
| P value | <0.0001 |
| P value summary | **** |
| Significant difference among means (P < 0.05)? | Yes |
| R square | 0.8307 |

| Tukey's Multiple Comparison Test | Summary | P Value |
|---|---|---|
| WT + vehicle vs Tcf4$^{+/-}$ + vehicle | **** | 0.0001 |
| WT + vehicle vs WT + cG-2-AllylP (100 mg/kg) | ns | >0.9999 |
| WT + vehicle vs Tcf4$^{+/-}$ + cG-2-AllylP (100 mg/kg) | ns | 0.0567 |
| WT + vehicle vs WT + cG-2-AllylP (200 mg/kg) | ns | >0.9999 |
| WT + vehicle vs Tcf4$^{+/-}$ + cG-2-AllylP (200 mg/kg) | ns | 0.9149 |
| Tcf4$^{+/-}$ + vehicle vs WT + cG-2-AllylP (100 mg/kg) | **** | <0.0001 |
| Tcf4$^{+/-}$ + vehicle vs Tcf4$^{+/-}$ + cG-2-AllylP (100 mg/kg) | **** | <0.0001 |
| Tcf4$^{+/-}$ + vehicle vs WT + cG-2-AllylP (200 mg/kg) | **** | <0.0001 |
| Tcf4$^{+/-}$ + vehicle vs Tcf4$^{+/-}$ + cG-2-AllylP (200 mg/kg) | **** | <0.0001 |
| WT + cG-2-AllylP (100 mg/kg) vs Tcf4$^{+/-}$ + cG-2-AllylP (100 mg/kg) | ns | 0.0645 |
| WT + cG-2-AllylP (100 mg/kg) vs WT + cG-2-AllylP (200 mg/kg) | ns | >0.9999 |
| WT + cG-2-AllylP (100 mg/kg) vs Tcf4$^{+/-}$ + cG-2-AllylP (200 mg/kg) | ns | 0.9313 |
| Tcf4$^{+/-}$ + cG-2-AllylP (100 mg/kg) vs WT + cG-2-AllylP (200 mg/kg) | ns | 0.0645 |
| Tcf4$^{+/-}$ + cG-2-AllylP (100 mg/kg) vs Tcf4$^{+/-}$ + cG-2-AllylP (200 mg/kg) | ns | 0.4130 |
| WT + cG-2-AllylP (200 mg/kg) vs Tcf4$^{+/-}$ + cG-2-AllylP (200 mg/kg) | ns | 0.9313 |

ANOVA = analysis of variance;
ns = not significant;
WT = wildtype littermate control
**** = p < 0.0001

We conclude that the elevation in a repetitive behavior (self grooming) as a consequence of the Tcf4$^{+/-}$ mutation was corrected by treatment with cG-2-AllylP at doses of either 100 mg/kg or 200 mg/kg.

Example 10: Fear Conditioning

Fear conditioning to either an event or a context represents a form of associative learning that has been well studied in many species. In mice, fear is often shown as stopping movement, also known as freezing behavior. Freezing is adaptive for prey species because predators often locate moving prey. The dependent measure used in contextual (delay) fear conditioning is a freezing response that takes place following pairing of an unconditioned stimulus (foot shock), with a conditioned stimulus (CS; e.g., an audible tone), a particular context and/or such a cue. If in a conditioning context one administers a foot shock that is paired with a tone, there will be learning not only to the tone, but also to the context.

Contextual fear conditioning is a basic conditioning procedure. It involves taking an animal and placing it in a novel environment, providing an aversive stimulus, and then removing it. When the animal is returned to the same environment, it generally will demonstrate a freezing response if it remembers and associates that environment with the aversive stimulus. Freezing is a response to fear, which has been defined as "absence of movement except for respiration." This freezing behavior may last from seconds to minutes depending on the strength of the aversive stimulus, the number of presentations, and the degree of learning achieved by the subject.

Figure 4:
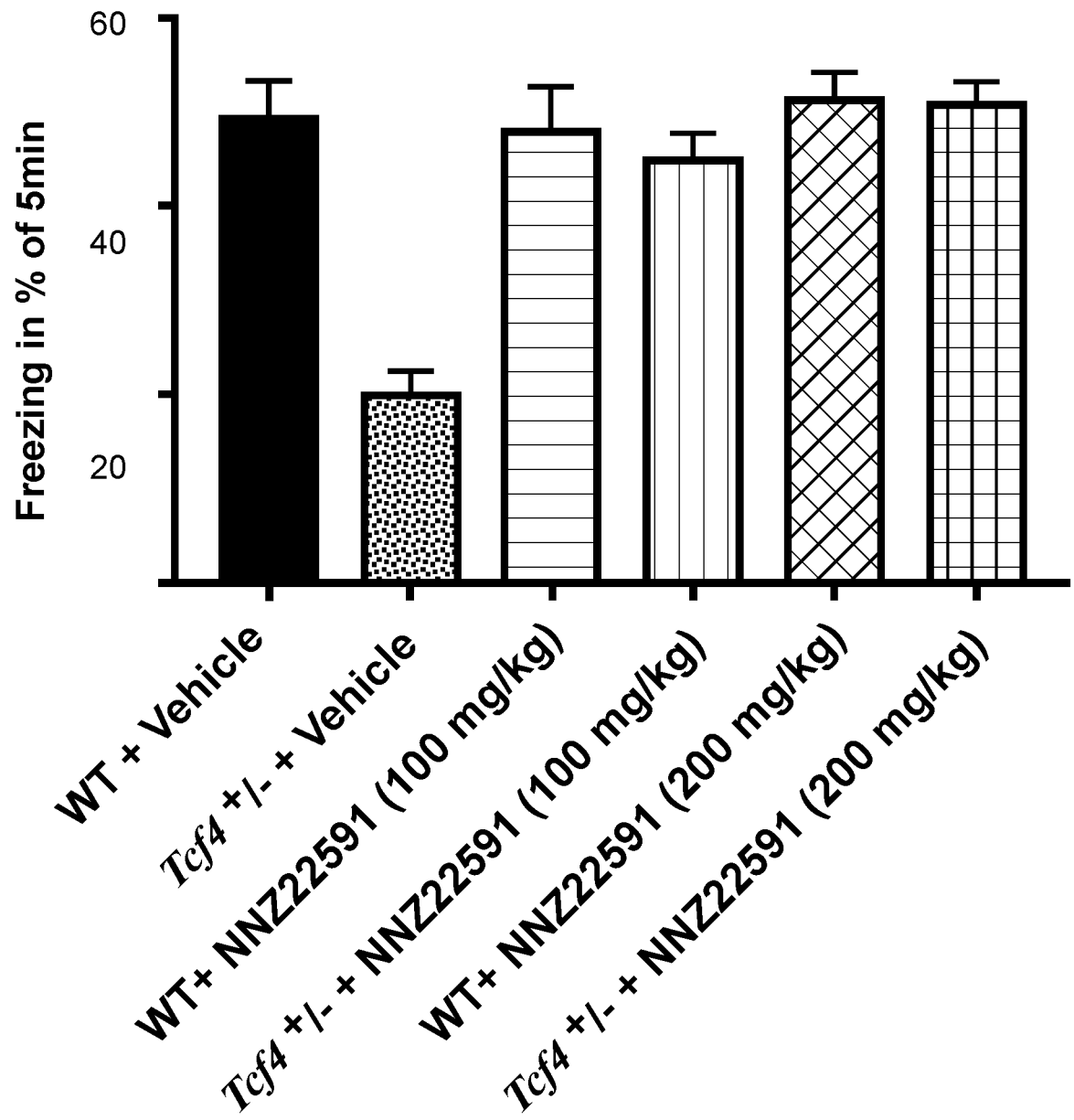
FIG. 4 is a graph showing results of studies of the effects of the effects of cG-2-AllylP or vehicle in mice having the tcf4$^{+/-}$ mutation on fear conditioning (time freezing in place) compared to wild type mice.

Animals with the Tcf4$^{+/-}$ mutation show less freezing behavior than wild type mice. This maladaptive behavior can have serious consequences. Therefore, to determine if NNZ-2591 (cG-2-AllylP) can restore normal fear conditioning in Tcf4$^{+/-}$ mice, we carried out a series of studies. FIG. 4 shows the results of these studies.

The percent of time spent in freezing over a 5-minute test period is shown on the vertical axis of FIG. 4. Animals and their treatments are shown on the horizontal axis.

Wild type mice treated with vehicle alone (left column) spent about 50% of the time in freezing behavior. Tcf4$^{+/-}$ mice (second column from left), in contrast, showed a substantial reduction in the time spent in freezing behavior. This was statistically significant.

WT mice treated with either 100 mg/kg (third column from left) or 200 mg/kg (fifth column from left) of NNZ-2591 (cG-2-AllylP) exhibited about the same amount of time in freezing behavior as did vehicle-treated WT mice.

In contrast to vehicle-treated Tcf4$^{+/-}$ mice, mice treated with either 100 mg/kg (fourth column from left) or 200 mg/kg (right column) spent a similar time in freezing behavior as WT mice. The difference between WT and animals treated with 200 mg/kg was not statistically significantly. However, the amount of time spent in freezing behavior of the NNZ-2591 (cG-2-AllylP)-treated mice was substantial and statistically significantly higher than vehicle-treated Tcf4$^{+/-}$ mice.

Fear Conditioning

| ANOVA Summary | |
|---|---|
| F | 169.4 |
| P value | <0.0001 |
| P value summary | **** |
| Significant difference among means (P < 0.05)? | Yes |
| R square | 0.9401 |

| Tukey's Multiple Comparisons Test | Summary | P Value |
|---|---|---|
| WT + vehicle vs Tcf4$^{+/-}$ + vehicle | **** | <0.0001 |
| WT + vehicle vs WT + cG-2-AllylP (100 mg/kg) | ns | 0.8232 |
| WT + vehicle vs Tcf4$^{+/-}$ + cG-2-AllylP (100 mg/kg) | * | 0.0109 |
| WT + vehicle vs WT + cG-2-AllylP (200 mg/kg) | ns | 0.6468 |
| WT + vehicle vs Tcf4$^{+/-}$ + cG-2-AllylP (200 mg/kg) | ns | 0.9492 |
| Tcf4$^{+/-}$ + vehicle vs WT + cG-2-AllylP (100 mg/kg) | **** | <0.0001 |
| Tcf4$^{+/-}$ + vehicle vs Tcf4$^{+/-}$ + cG-2-AllylP (100 mg/kg) | **** | <0.0001 |
| Tcf4$^{+/-}$ + vehicle vs WT + cG-2-AllylP (200 mg/kg) | **** | <0.0001 |
| Tcf4$^{+/-}$ + vehicle vs Tcf4$^{+/-}$ + cG-2-AllylP (200 mg/kg) | **** | <0.0001 |
| WT + cG-2-AllylP (100 mg/kg) vs Tcf4$^{+/-}$ + cG-2-AllylP (100 mg/kg) | ns | 0.2139 |
| WT + cG-2-AllylP (100 mg/kg) vs WT + cG-2-AllylP (200 mg/kg) | ns | 0.0811 |
| WT + cG-2-AllylP (100 mg/kg) vs Tcf4$^{+/-}$ + cG-2-AllylP (200 mg/kg) | nx | 0.2819 |
| Tcf4$^{+/-}$ + cG-2-AllylP (100 mg/kg) vs WT + cG-2-AllylP (200 mg/kg) | **** | <0.0001 |
| Tcf4$^{+/-}$ + cG-2-AllylP (100 mg/kg) vs Tcf4$^{+/-}$ + cG-2-AllylP (200 mg/kg) | *** | 0.0006 |
| WT + cG-2-AllylP (200 mg/kg) vs Tcf4$^{+/-}$ + cG-2-AllylP (200 mg/kg) | ns | 0.9897 |

ANOVA = analysis of variance;
ns = not significant;
WT = wildtype littermate control;
**** = p < 0.0001;
*** = p < 0.001;
* = p < 0.05

Example 11: Social Interaction

Social recognition and social memory in humans are very important. People with PTHS show lower amounts of social recognition and memory compared with people without PTHS. Similarly, Tcf4$^{+/-}$ mice show substantially reduced social interaction compared to wild type mice. Therefore, to determine if NNZ-2591 (cG-2-AllylP) could be effective in normalizing this condition, we carried out a series of studies in mice, in which we determined the amount of time that mice spent sniffing a novel mouse.

Figure 5:
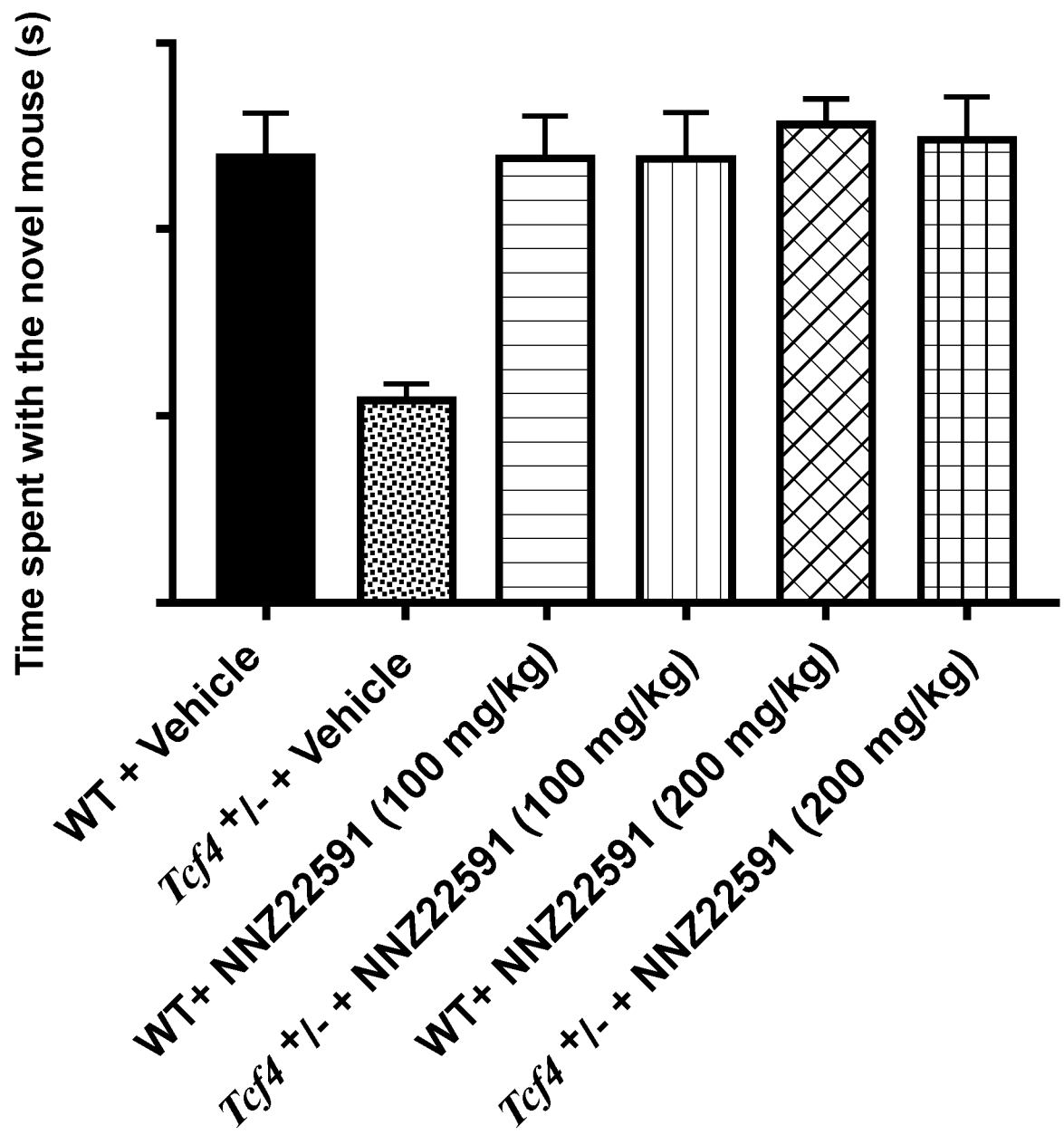
FIG. 5 is a graph showing results of studies of the effects of the effects of cG-2-AllylP or vehicle in mice having the tcf4$^{+/-}$ mutation on sociability (time spent with novel mouse) compared to wild type mice.

To carry out these studies, mice were evaluated by the amount of time spent sniffing a novel mouse upon repeated exposures, to induce familiarity, and reinstatement of high levels of sniffing when a novel stimulus animal is introduced. We measured the number of bouts of sniffing in each of the groups of animals. Results of these studies are shown in FIG. 5. The time spent sniffing a novel mouse is shown on the vertical axis and the animals and treatments are shown on the horizontal axis.

Time spent sniffing a novel mouse by WT mice treated with vehicle only (left column) was used as the control in the experiment. Tcf4$^{+/-}$ mice treated with vehicle only (second column from left) showed a substantially lower amount of time sniffing the novel mouse. WT mice treated with either 100 mg/kg (third column from left) or 200 mg/km (fifth column from left) showed nearly identical times spend sniffing the novel mouse. Tcf4$^{+/-}$ mice treated with cG-2-AlylP at doses of either 100 mg/kg (fourth column from left) or 200 mg/kg (right column) showed substantial and statistically significant increases in the amount of time spent with the novel mouse compared to Tcf4$^{+/-}$ mice treated with vehicle only.

Sociability

| Tukey's Multiple Comparison Test | Summary | P Value |
|---|---|---|
| WT + vehicle vs Tcf4$^{+/-}$ + vehicle | **** | <0.0001 |
| WT + vehicle vs WT + cG-2-AllylP (100 mg/kg) | ns | >0.9999 |
| WT + vehicle vs Tcf4$^{+/-}$ + cG-2-AllylP (100 mg/kg) | ns | 0.2590 |
| WT + vehicle vs Tcf4$^{+/-}$ + cG-2-AllylP (200 mg/kg) | ns | 0.8811 |
| Tcf4$^{+/-}$ + vehicle vs WT + cG-2-AllylP (100 mg/kg) | **** | <0.0001 |
| Tcf4$^{+/-}$ + vehicle vs Tcf4$^{+/-}$ + cG-2-AllylP (100 mg/kg) | **** | <0.0001 |
| Tcf4$^{+/-}$ + vehicle vs WT + cG-2-AllylP (200 mg/kg) | **** | <0.0001 |

-continued

| Tukey's Multiple Comparison Test | Summary | P Value |
|---|---|---|
| Tcf4$^{+/-}$ + vehicle vs Tcf4$^{+/-}$ + cG-2-AllylP (200 mg/kg) | **** | <0.0001 |
| WT + cG-2-AllylP (100 mg/kg) vs Tcf4$^{+/-}$ + cG-2-AllylP (100 mg/kg) | ns | >0.9999 |
| WT + cG-2-AllylP (100 mg/kg) vs WT + cG-2-AllylP (200 mg/kg) | ns | 0.2321 |
| WT + cG-2-AllylP (100 mg/kg) vs Tcf4$^{+/-}$ + cG-2-AllylP (200 mg/kg) | ns | 0.8553 |
| Tcf4$^{+/-}$ + cG-2-AllylP (100 mg/kg) vs WT + cG-2-AllylP (200 mg/kg) | ns | 0.2590 |
| Tcf4$^{+/-}$ + cG-02-AllylP (100 mg/kg) vs Tcf4$^{+/-}$ + cG-2-AllylP (200 mg/kg) | ns | 0.8811 |
| WT + cG-2-AllylP (200 mg/kg) vs Tcf4$^{+/-}$ + cG-2-AllylP (200 mg/kg) | ns | 0.8811 |

ANOVA = analysis of variance;
ns = not significant;
WT = wildtype littermate control;
**** = p < 0.0001

Example 12: Nest Building

Figure 6:
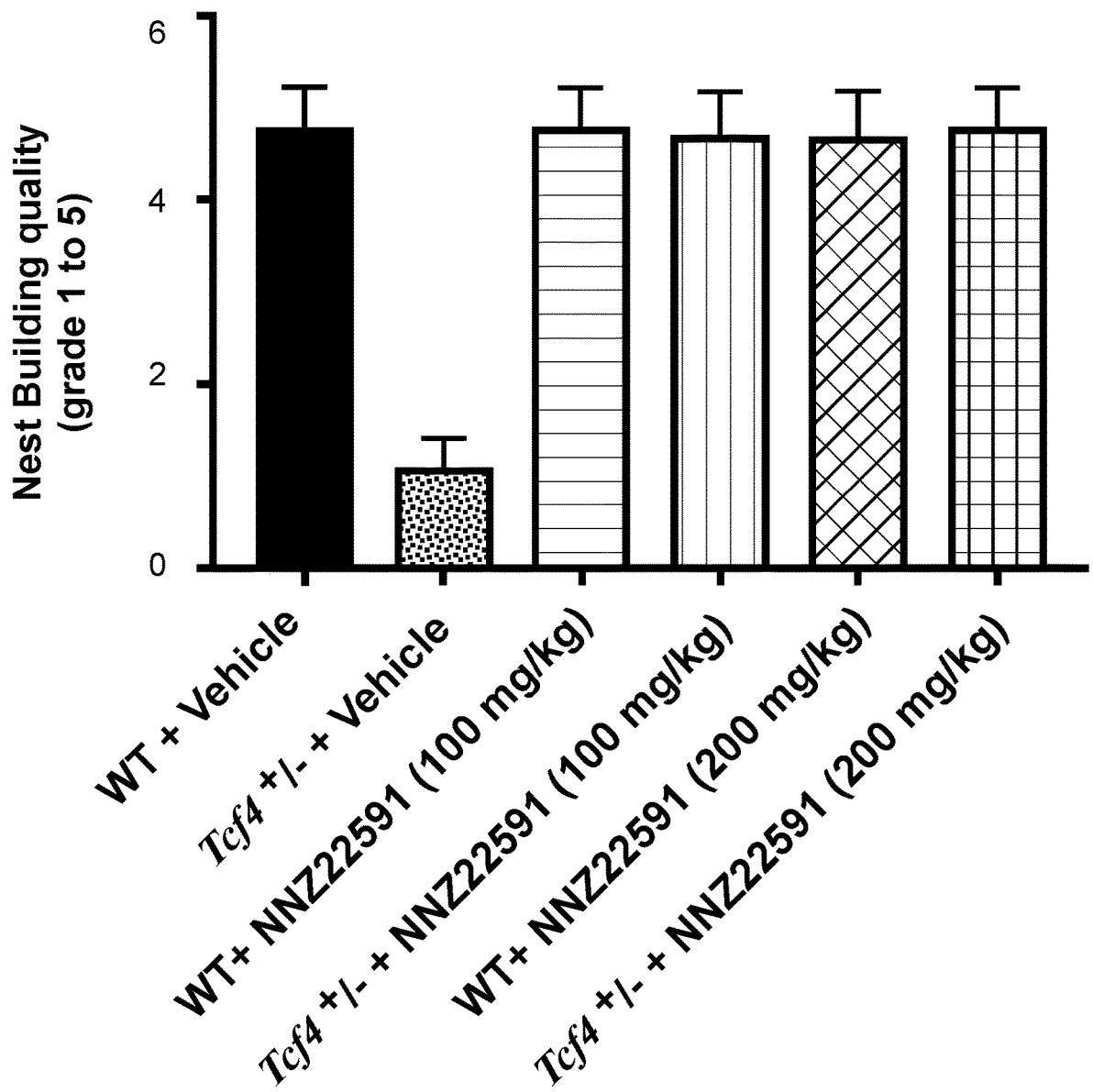
FIG. 6 is a graph showing results of studies of the effects of the effects of cG-2-AllylP or vehicle in mice having the tcf4$^{+/-}$ mutation on daily living (nest building) compared to wild type mice.

Nest building is an activity needed for mice to raise their offspring and is an indicator of social adaptation and activities of daily living. Tcf4$^{+/-}$ mice build nests of substantially lower quality than wild type mice. Therefore, to determine if NNZ-2591 (cG-2-AllylP) might restore the quality of nest building, we carried out a series of studies. Results are shown in FIG. 6. The vertical axis shows nest building quality on a grade of 1-5, and the horizontal axis shows animals and treatments.

Wild type mice treated with vehicle only exhibited nest building quality of about 5. In contrast, Tcf4$^{+/-}$ mice treated with vehicle only (second column from left) built nexts of substantially lower quality. WT animals treated with either 100 mg/kg (NNZ-2591 (cG-2-AllylP; third column from left) or 200 mg/kg (fifth column from left) built nests of quality nearly identical to those of vehicle-treated WT mice. Tcf4$^{+/-}$ mice treated with either 100 mg/kg (fourth column from left) or 200 mg/kg NNZ-2591 (cG-2-AllylP; right column) normalized the quality of nests to levels nearly identical to WT mice. The differences in quality of nests built by the Tcf4$^{+/-}$ mice treated with NNZ-2591 were substantially and statistically significantly better than those built by the Tcf4$^{+/-}$ mice treated with vehicle only.

Test of Daily Living

| ANOVA Summary | |
|---|---|
| F | 121.9 |
| P value | <0.0001 |
| P value summary | **** |
| Significant difference among means (P < 0.05)? | Yes |
| R square | 0.9186 |

| Tukey's Multiple Comparison Test | Summary | P Value |
|---|---|---|
| WT + vehicle vs Tcf4$^{+/-}$ + vehicle | **** | <0.0001 |
| WT + vehicle vs WT + cG-2-AllylP (100 mg/kg) | ns | >0.9999 |
| WT + vehicle vs Tcf4$^{+/-}$ + cG-2-AllylP (100 mg/kg) | ns | 0.9951 |
| WT + vehicle vs WT + cG-2-AllylP (200 mg/kg) | ns | 0.9951 |
| WT + vehicle vs Tcf4$^{+/-}$ + cG-2-AllylP (200 mg/kg) | ns | >0.9999 |
| Tcf4$^{+/-}$ + vehicle vs WT + cG-2-AllylP (100 mg/kg) | **** | <0.0001 |
| Tcf4$^{+/-}$ + vehicle vs Tcf4$^{+/-}$ + cG-2-AllylP (100 mg/kg) | **** | <0.0001 |
| Tcf4$^{+/-}$ + vehicle vs WT + cG-2-AllylP (200 mg/kg) | **** | <0.0001 |
| Tcf4$^{+/-}$ + vehicle vs Tcf4$^{+/-}$ + cG-2-AllylP (200 mg/kg) | **** | <0.0001 |
| WT + cG-2-AllylP (100 mg/kg) vs Tcf4$^{+/-}$ + cG-2-AllylP (100 mg/kg) | ns | 0/9951 |
| WT + cG-2-AllylP (100 mg/kg) vs WT + cG-2-AllylP (200 mg/kg) | ns | 0.9951 |
| WT + cG-2-AllylP (100 mg/kg) vs Tcf4$^{+/-}$ + cG-2-AllylP (200 mg/kg) | ns | >0.9999 |
| Tcf4$^{+/-}$ + cG-2-AllylP (100 mg/kg) vs WT + cG-2-AllylP (200 mg/kg) | ns | >0.9999 |
| Tcf4$^{+/-}$ + cG-2-AllylP (100 mg/kg) vs Tcf4$^{+/-}$ + cG-2-AllylP (200 mg/kg) | ns | 0.9951 |
| WT + cG-2-AllylP (200 mg/kg) vs Tcf4$^{+/-}$ + cG-2-AllylP (200 mg/kg) | ns | 0.9951 |

ANOVA = analysis of variance;
no = not significant;
WT = wildtype littermate control;
**** = p < 0.0001.

Example 13: Hind Limb Force

Figure 7:
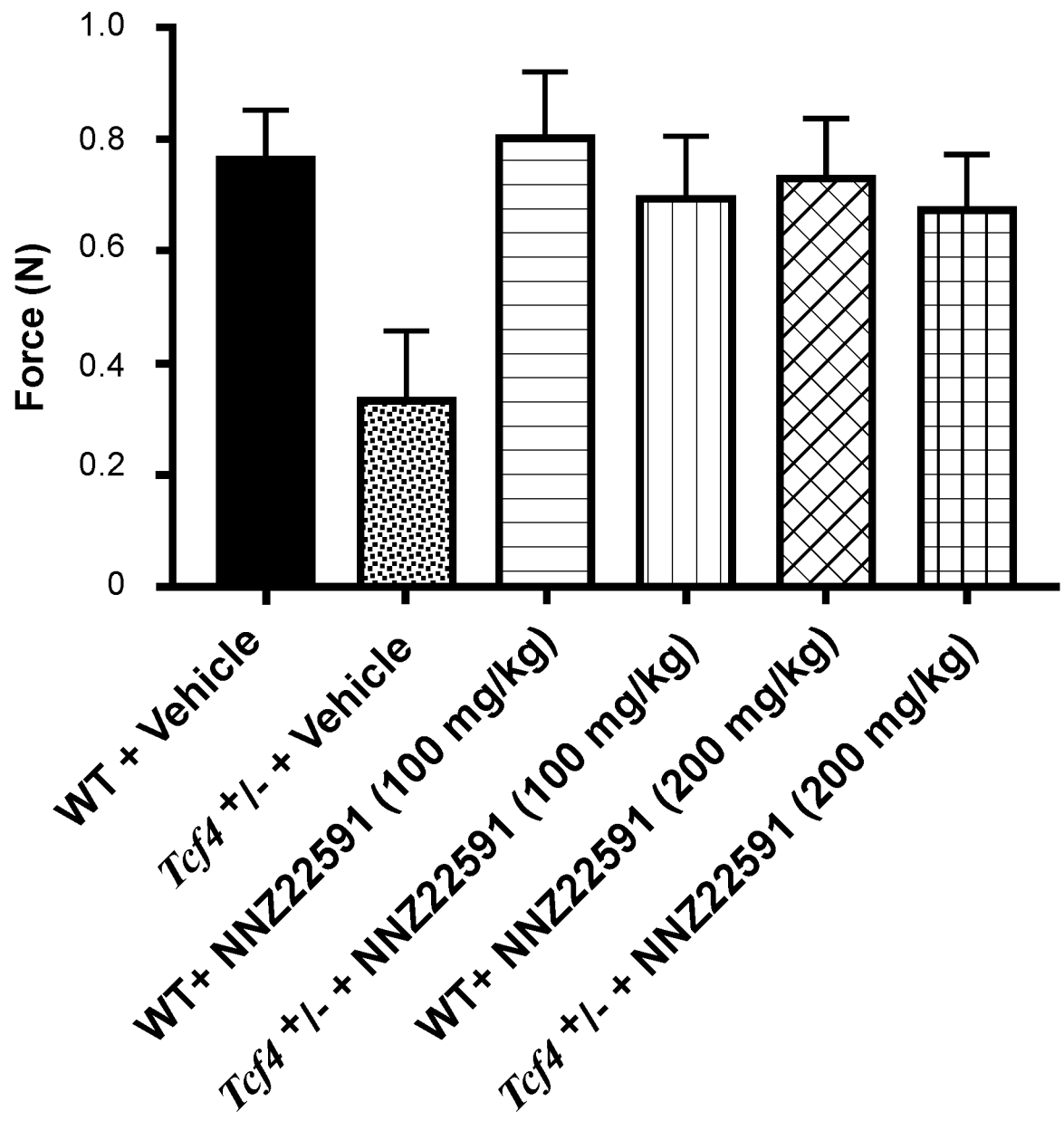
FIG. 7 is a graph showing results of studies of the effects of the effects of cG-2-AllylP or vehicle in mice having the tcf4$^{+/-}$ mutation on motor performance (hind limb force) compared to wild type mice.

Hind limb force is an important measure of the ability of a mouse to jump away from a predator. However, animals with the Tcf4$^{+/-}$ mutation have substantially lower ability to jump away from a predator, making this mutation very serious and potentially life threatening. Hind limb force is also considered a surrogate for motor function in humans. To determine if NNZ-2591 (cG-2-AllylP) might provide a helpful treatment for this condition, we carried out a series of studies in which we measured hind limb force. These results are shown in FIG. 7. The vertical axis shows the force in Newtons (N), and the horizontal axis shows the animals and treatments.

Wild type mice treated with vehicle only were able to generate about 8 N of force. In contrast, vehicle-treated Tcf4$^{+/-}$ mice (second column from left) were able to produce only about 0.3 N. This is a substantial and statistically significant deficit. WT mice treated with either 100 mg/kg NNZ-2591 (third column from left) or 200 mg/kg (fifth column from left) were able to generate about the same levels of force as vehicle-treated WT mice. Tcf4$^{+/-}$ mice treated with either 100 mg/kg (fourth column from left) or 200 mg/kg NNZ-2591 (right column) produced forces nearly identical to those produced by WT mice. In contrast, Tcf4$^{+/-}$ mice treated with either 100 mg/kg (fourth column from left) or 200 mg/kg NNZ-2591 were able to produce substantially and statistically significantly greater force than vehicle-treated Tcf4$^{+/-}$ mice. Therefore, we conclude that the weakness and motor dysfunction due to PTHS was normalized by treatment with cG-2-AllylP.

Test of Force (Hind Limb)

| ANOVA summary | |
|---|---|
| F | 28.14 |
| P value | <.0001 |
| P value summary | **** |
| Significant difference among means (P < 0.05)? | Yes |
| R square | 0.7226 |

-continued

| Tukey's Muliple Comparison Test | Summary | P Value |
|---|---|---|
| WT + vehicle vs Tcf4$^{+/-}$ + vehicle | **** | <0.0001 |
| WT + vehicle vs WT + cG-2-AllylP (100 mg/kg) | ns | 0.9490 |
| WT + vehicle vs Tcf4$^{+/-}$ + cG-2-AllylP (100 mg/kg) | ns | 0.6371 |
| WT + vehicle vs WT + cG-2-AllylP (200 mg/kg) | ns | 0.9853 |
| WT + vehicle vs Tcf4$^{+/-}$ + cG-2-AllylP (200 mg/kg) | ns | 0.3631 |
| Tcf4$^{+/-}$ + vehicle vs WT + cG-2-AllylP (100 mg/kg) | **** | <0.0001 |
| Tcf4$^{+/-}$ + vehicle vs Tcf4$^{+/-}$ + cG-2-AllylP (100 mg/kg) | **** | <0.0001 |
| Tcf4$^{+/-}$ + vehicle vs WT + cG-2-AllylP (200 mg/kg) | **** | <0.0001 |
| Tcf4$^{+/-}$ + vehicle vs Tcf4$^{+/-}$ + cG-2-AllylP (200 mg/kg) | **** | <0.0001 |
| WT + cG-2-AllylP (100 mg/kg) vs Tcf4$^{+/-}$ + cG-2-AllylP (100 mg/kg) | ns | 0.1649 |
| WT + cG-2-AllylP (100 mg/kg) vs WT + cG-2-AllylP (200 mg/kg) | ns | 0.6371 |
| WT + cG-2-AllylP (100 mg/kg) vs Tcf4$^{+/-}$ + cG-2-AllylP (200 mg/kg) | ns | 0.0616 |
| Tcf4$^{+/-}$ + cG-2-AllylP (100 mg/kg) vs WT + cG-2-AllylP (200 mg/kg) | ns | 0.9490 |
| Tcf4$^{+/-}$ + cG-2-AllylP (100 mg/kg) vs Tcf4$^{+/-}$ + cG-2-AllylP (200 mg/kg) | ns | 0.9978 |
| WT + cG-2-AllylP (200 mg/kg) vs Tcf4$^{+/-}$ + cG-2-AllylP (200 mg/kg) | ns | 0.7702 |

ANOVA = analysis of variance;
ns = not significant;
WT = wildtype littermate control;
**** = p <0.00001.

Summary

As summarized in Table 3, using the Tcf4$^{+/-}$ mouse model, treatment with cG-2-AllylP at 200 mg/kg for 6 weeks rescued all tested behaviors of the PTHS phenotype. At 100 mg/kg, treatment with cG-2-AllylP rescued all tested behaviors, except for fear conditioning, which was improved but remained significantly different to Wild Type.

TABLE 3

Summary of Behaviors Normalized to WildType Levels

| | Open Field | Self-groom | Fear Con | Nesting | Sociability | Force |
|---|---|---|---|---|---|---|
| Tcf4$^{+/-}$ + cG-2-AllylP (100 mg/kg) | ✓ | ✓ | X | ✓ | ✓ | ✓ |
| Tcf4$^{+/-}$ + cG-2-AllylP (200 mg/kg) | ✓ | ✓ | ✓ | ✓ | ✓ | ✓ |

REFERENCES

All patents and patent applications referred to, and the following references are incorporated herein fully by reference.

Amiel J, Rio M, de Pontual L, et al. Mutations in TCF4, encoding a class I basic helix-loop-helix transcription factor, are responsible for Pitt-Hopkins syndrome, a severe epileptic encephalopathy associated with autonomic dysfunction. Am J Hum Genet. 2007; 80(5):988-993.

Bertrand N, Castro D S, Guillemot F. Proneural genes and the specification of neural cell types. Nat Rev Neurosci. 2002; 3(7):517-530.

Blake D J, Forrest M, Chapman R M, et al. TCF4, schizophrenia, and Pitt-Hopkins Syndrome. Schizophr Bull. 2010; 36(3):443-447. doi: https://doi. org/10. 1093/schbul/sbq035.

Brockschmidt A, Todt U, Ryu S, et al. Severe mental retardation with breathing abnormalities (Pitt-Hopkins syndrome) is caused by haploinsufficiency of the neuronal bHLH transcription factor TCF4. Hum Mol Genet. 2007; 16(12):1488-1494.

Brzozka M M, Radyushkin K, Wichert S P, Ehrenreich H, Rossner M J. Cognitive and Sensorimotor Gating Impairments in Transgenic Mice Overexpressing the Schizophrenia Susceptibility Gene Tcf4 in the Brain. Biol Psychiatry. 2010; 68(1):33-40. https://doi.org/10. 1016/j.biopsych. 2010. 03.015.

Crux S, Herms J, Dorostkar M M. Tcf4 regulates dendritic spine density and morphology in the adult brain. PLoS ONE. 2018; 13(6):e0199359. https://doi. org/10.1371/journal. pone. 0199359.

de Pontual L, Mathieu Y, Golzio C, et al. Mutational, functional, and expression studies of the TCF4 gene in Pitt-Hopkins Syndrome. Hum Mutat. 2009; 30(4):669-676.

Flora A, Garcia J J, Thaller C, Zoghbi H Y. The E-protein Tcf4 interacts with Math1 to regulate differentiation of a specific subset of neuronal progenitors. Proc Nat Acad Sci U.S.A. 2007; 104(39):15382-15387. DOI:10.1073/pnas.0707456104.

Forrest M P, Waite A J, Martin-Rendon E, Blake D J. Knockdown of human TCF4 affects multiple signaling pathways involved in cell survival, epithelial to mesenchymal transition and neuronal differentiation. PLoS One. 2013; 8(8):e73169. https://doi.org/10.1371/journal.pone. 0073169.

Guan J, Mathai S, Harris P, et al. Peripheral administration of a novel diketopiperazine, NNZ 2591, prevents brain injury and improves somatosensory-motor function following hypoxia-ischemia in adult rats. Neuropharmacology. 2007; 53(6):749-762. https://doi.org/10.1016/j.neuropharm. 2007.08.010.

Guan J, Zhang R, Dale-Gandar L, Hodgkinson S, Vickers M H. NNZ-2591, a novel diketopiperazine, prevented scopolamine-induced acute memory impairment in the adult rat. Behav Brain Res. 2010; 210(2):221-228. https://doi.org/10.1016/j.bbr.2010.02.039

Guan J, Gluckman P, Yang P et al. Cyclic glycine-proline regulates IGF-1 homeostasis by altering the binding of IGFBP-3 to IGF-1. Sci Rep. 2014; 4:4388. DOI:10.1038/srep04388.

Kennedy A J et al. Tcf4 Regulates Synaptic Plasticity, DNA Methylation, and Memory Function. Cell Rep. 2016 Sep. 6; 16(10): 2666-2685. 10.1016/j.celrep.2016. 08.004.

Krishnamurthi R V, Mathai S, Kim A H, Zhang R, Guan J. A novel diketopiperazine improves functional recovery given after the onset of 6-OHDA-induced motor deficit in rats. Br J Pharmacol. 2009; 156(4):662-672.

Navarrete K, Pedroso I, De Jong S, et al. TCF4 (e2-2; ITF2): A schizophrenia-associated gene with pleiotropic effects on human disease. Am J Med Genet B Neuropsychiatr Genet. 2013; 162B(1):1-16. doi:https://doi.org/10.1002/ajmg.b. 32109.

Pscherer A, Dorflinger U, Kirfel J, et al. The helix-loop-helix transcription factor SEF-2 regulates the activity of a novel initiator element in the promoter of the human somatostatin receptor II gene. EMBO J. 1996; 15(23):6680-6690. https://doi.org/10.1002/j.1460-2075. 1996. tb01058.x Rosenfeld J A, Leppig K, Ballif B C, et al. Genotype-phenotype analysis of TCF4 mutations causing Pitt-Hopkins syndrome shows increased seizure activity with missense mutations. *Genet Med.* 2009; 11(11):797-805.

Sepp M, Kanike K, Eesmaa A, Urb M, Timmusk T. Functional diversity of human basic helix-loop-helix transcription factor TCF4 isoforms generated by alternative 5' exon usage and splicing. *PLoS One.* 2011; 6(7):e22138. doi:10.1371/journal.pone.0022138.

Sweatt J D. Pitt-Hopkins Syndrome: intellectual disability due to loss of TCF4-regulated gene transcription. *Exp Mol Med.* 2013; 45:e21. doi:10.1038/emm.2013.32.

Sweetser D A, Elsharkawi I, Yonker L, et al. Pitt-Hopkins Syndrome. 2012 Aug. 30 [Updated 2018 Apr. 12]. In: Adam M P, Ardinger H H, Pagon R A, et al., editors. Gene Reviews® [Internet]. Seattle (Wash.): University of Washington, Seattle; 1993-2019.

Thaxton C, Kloth A D, Clark E P, Moy S S, Chitwood R A, Philpot B D. Common Pathophysiology in Multiple Mouse Models of Pitt-Hopkins Syndrome. *J Neurosci.* 2018; 24; 38(4):918-936. doi: 10.1523/JNEUROSCI.1305-17.2017. Epub 2017 Dec. 8.

UK Animals (Scientific Procedures) Act, 1986.

United States Census Bureau, Population Clock; July 12' 2019; 0.045 UTC. www. census.gov/popclock.

INDUSTRIAL APPLICABILITY

Embodiments of this disclosure are useful in the medical and veterinary arts and are industrially applicable.

What is claimed is:

1. A method for treating a mammal having Pitt Hopkins Syndrome, comprising administering to the mammal, a compound having the formula:

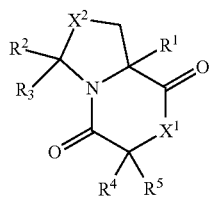

or a pharmaceutically acceptable salt or hydrate thereof, wherein
$X^1$ is selected from the group consisting of NR', O and S;
$X^2$ is selected from the group consisting of $CH_2$, NR', O and S;
$R^1$, $R^2$, $R^3$, $R^4$ and $R^5$ are independently selected from the group consisting of —H, —OR', —SR', —NR'R', —NO$_2$, —CN, —C(O) R', —C(O) OR', —C(O) NR'R', —C(NR') NR'R', trihalomethyl, halogen, alkyl, substituted alkyl, heteroalkyl, substituted heteroalkyl, alkenyl, substituted alkenyl, alkynyl, substituted alkynyl, aryl, substituted aryl, heteroaryl, substituted heteroaryl, arylalkyl, substituted arylalkyl, heteroarylalkyl and substituted heteroarylalkyl; each R' is independently selected from the group consisting of —H, alkyl, heteroalkyl, alkenyl, alkynyl, aryl, arylalkyl, heteroaryl and heteroarylalkyl;
or $R^4$ and $R^5$ taken together are —CH$_2$—(CH$_2$)$_n$—CH$_2$— where n is an integer from 0-6;
or $R^2$ and $R^3$ taken together are —CH$_2$—(CH$_2$)$_n$—CH$_2$— where n is an integer from 0-6;
with the proviso that when $R^1$=methyl and $R^2$=$R^3$=$R^4$=H then $R^5$≠benzyl and;
when $R^1$=H, at least one of $R^2$ and $R^3$≠H.

2. The method of claim 1 where $R^1$=methyl.

3. The method of claim 1 where $R^1$=allyl.

4. The method of claim 1 where $R^2$=$R^3$=methyl and $X^2$=S.

5. The method of claim 1 where $R^1$=allyl, $R^2$=$R^3$=$R^4$=$R^5$=H, $X^1$=NH, $X^2$=CH$_2$ (cG-2-AllylP).

6. The method of claim 1 where $R^1$=methyl, $R^2$=$R^3$=H, $R^4$ and $R^5$ taken together are —CH$_2$—(CH$_2$) 3-CH$_2$—, $X^1$=NH, $X^2$=CH$_2$.

7. The method of claim 1 where $R^1$=methyl, $R^2$=$R^3$=H, $R^4$ and $R^5$ taken together are —CH$_2$—(CH$_2$) 2-CH$_2$—, $X^1$=NH, $X^2$=CH$_2$.

8. The method of claim 1, where the method further comprises administering said compound along with a pharmaceutically acceptable excipient, and/or in a gel.

9. The method of claim 1, where the method further comprises administering said compound along with a pharmaceutically acceptable excipient and a binder.

10. The method of claim 1, where the method further comprises administering said compound along with a pharmaceutically acceptable excipient, or in a capsule.

11. The method of claim 1, further comprising administering at least one anti-apoptotic compound, anti-necrotic compound, neuroprotective agent or an anti-inflammatory agent.

12. The method of claim 11 where the anti-apoptotic compound, anti-necrotic compound, or neuroprotective agent is selected from the group consisting of insulin-like growth factor-I (IGF-I), insulin-like growth factor-II (IGF-II), transforming growth factor-β1, activin, growth hormone, nerve growth factor, growth hormone binding protein, IGFBP-3, basic fibroblast growth factor, acidic fibroblast growth factor, the hst/Kfgk gene product, FGF-3, FGF-4, FGF-6, keratinocyte growth factor, androgen-induced growth factor, int-2, fibroblast growth factor homologous factor-1 (FHF-1), FHF-2, FHF-3, FHF-4, keratinocyte growth factor 2, glial-activating factor, FGF-10, FGF-16, ciliary neurotrophic factor, brain derived growth factor, neurotrophin 3, neurotrophin 4, bone morphogenetic protein 2 (BMP-2), glial-cell line derived neurotrophic factor, activity-dependant neurotrophic factor, cytokine leukaemia inhibiting factor, oncostatin M, an interleukin, α-interferon, β-interferon, γ-interferon, consensus interferon, TNF-α, clomethiazole; kynurenic acid, Semax, tacrolimus, L-threo-1-phenyl-2-decanoylamino-3-morpholino-1-propanol, adrenocorticotropin-(4-9) analogue (ORG 2766), dizolcipine [MK-, 801], selegiline, NPS1506, GV1505260, MK-801, GV150526, 2,3-dihydroxy-6-nitro-7-sulfamoylbenzo (f) quinoxaline (NBQX), LY303070, LY300164, and the anti-MAdCAM-1 antibody MECA-367.

13. The method of claim 1, wherein said compound is cyclic cyclohexyl-G-2MeP.

14. The method of claim 1, wherein said compound is cyclic cyclopentyl-G-2MeP.

15. The method of claim 1, wherein said treatment produces an improvement in a symptom of the disorder as assessed using one or more clinical tests selected from the group consisting of Aberrant Behavior Checklist Community Edition (ABC), Vineland Adaptive Behavior Scales, Clinical Global Impression of Severity (CGI-S), Clinical Global Impression Improvement (CGI-1), the Caregiver Strain Questionnaire (CSQ), electroencephalogram (EEG) spike frequency, overall power in frequency bands of an EEG, hemispheric coherence of EEG frequencies, stereotypic hand movement, eye tracking, QTc variability, heart rate variability (HRV), respiratory irregularities, and abnormal coupling of cardiac and respiratory function compared to control animals not suffering from said disorder.

16. The method of claim 1, wherein said treatment reduces at least one symptom selected from the group consisting of anxiety, depression, cognitive impairment, cognitive dysfunction, memory loss, loss of spatial orientation, decreased ability to learn, decreased ability to form short- or long-term memory, decreased episodic memory, decreased ability to consolidate memory, decreased spatial memory, decreased synaptogenesis, decreased synaptic stability, deficits in executive function, deficits in cognitive mapping and scene memory, deficits in declarative and relational memory, decreased rapid acquisition of configural or conjunctive associations, decreased context-specific encoding and retrieval of specific events, decreased episodic and/or episodic-like memory, abnormal fear conditioning, abnormal social behaviour, repetitive behaviour, abnormal nocturnal behavior, seizure activity, abnormal locomotion, abnormal expression of Phospho-ERK1/2, abnormal expression of Phospho-Akt, and bradycardia.

17. The method of claim 1, wherein the dose of the compound is from about 0.001 mg/kg to about 600 mg/kg.

18. The method of claim 1, wherein said mammal is a human being.

* * * * *